US007016090B2

(12) United States Patent
Sekine

(10) Patent No.: US 7,016,090 B2
(45) Date of Patent: Mar. 21, 2006

(54) AUTOMATIC DOCUMENT FEEDER AND IMAGE FORMING APPARATUS INCLUDING THE SAME

(75) Inventor: Noriaki Sekine, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 899 days.

(21) Appl. No.: 10/101,053

(22) Filed: Mar. 20, 2002

(65) Prior Publication Data

US 2002/0135821 A1 Sep. 26, 2002

(30) Foreign Application Priority Data

Mar. 21, 2001 (JP) ............................. 2001-081579
Jan. 16, 2002 (JP) ............................. 2002-007436

(51) Int. Cl.
*H04N 1/04* (2006.01)
*G03G 15/00* (2006.01)

(52) U.S. Cl. ...................... 358/498; 358/497; 399/374; 399/367; 399/364

(58) Field of Classification Search ................ 358/498, 358/496, 497, 474, 505; 399/374, 367, 364; 271/3.08, 10.01, 12, 124, 301, 225
See application file for complete search history.

(56) References Cited

U.S. PATENT DOCUMENTS 4,923,190 A 5/1990 Hirose ....................... 271/3.07
5,695,182 A 12/1997 Sekine ....................... 271/9.09
5,718,313 A 2/1998 Sekine ....................... 192/24
5,957,447 A 9/1999 Sekine ....................... 271/9.09
6,459,879 B1 * 10/2002 Naruse ....................... 399/367
6,641,132 B1 * 11/2003 Sekine ....................... 271/124

FOREIGN PATENT DOCUMENTS

| | | |
|---|---|---|
| JP | 7-79313 | 3/1995 |
| JP | 9-292742 | 11/1997 |
| JP | 10-020568 | 1/1998 |
| JP | 11-5659 | 1/1999 |
| JP | 11-171371 | 6/1999 |
| JP | 2000-191205 | 7/2000 |

* cited by examiner

*Primary Examiner*—Cheukfan Lee
(74) *Attorney, Agent, or Firm*—Oblon, Spivak, McClelland, Maier & Neustadt, P.C.

(57) ABSTRACT

An ADF (Automatic Document Feeder) of the present invention includes a path for conveying a document from a scanning position, reversing the document to switch it back, and again reversing the document to thereby convey it toward a receipt tray positioned below a feed tray. Another path conveys the document away from the scanning position, reverses the document, and then conveys it to the receipt tray. Two path selectors selectively steer the document to either one of the above two paths. In both of a one-side mode and a both-side mode, the document is driven out of the ADF to the same receipt tray. The ADF promotes rapid conveyance and facilitates the removal of a jamming document.

70 Claims, 24 Drawing Sheets

AUTOMATIC DOCUMENT FEEDER AND IMAGE FORMING APPARATUS INCLUDING THE SAME

BACKGROUND OF THE INVENTION

1. Field of the Invention

The present invention relates to an ADF (Automatic Document Feeder) for sequentially conveying documents stacked on a feed tray while separating them one by one, and an image forming apparatus including the same.

2. Description of the Background Art

Japanese Patent Laid-Open Publication No.11-192374, for example, discloses an ADF including two receipt trays respectively assigned to a one-side mode and a both-side mode. The one-side mode and both-side mode refer to the conveyance of a document carrying an image on one side and that of a document carrying images on both sides, respectively. The two receipt trays allow documents to be sequentially driven out of the ADF in order of page while promoting rapid conveyance.

Japanese Patent Laid-Open Publication No. 8-110662 proposes an ADF also including two trays respectively assigned to the one-side mode and both-side mode. The tray for the one side mode is positioned horizontally and partly slidable. The tray for the both-side mode is positioned below a feed tray. Further, the proposed ADF includes a plurality of belts positioned on a glass platen and driven independently of each other and a reversing mechanism. The belts are driven synchronously or asynchronously to each other in accordance with the length of a document as measured in the direction of conveyance, thereby reducing a copying time when documents of different sizes are stacked together.

Japanese Patent Laid-Open Publication No. 6-242648 teaches an ADF in which a usual discharging section and a sheet-through discharging section are arranged one after the other in the direction of conveyance. In addition, a foldable document tray is positioned at the rear of the sheet-through discharging section.

Japanese Patent Laid-Open Publication No. 5-6053 proposes an ADF including a feed tray mounted on a side wall and a receipt tray positioned above a glass platen. The receipt tray forms part of a movable main frame that implements a feeding and discharging device. The main frame is movable between a closed position and an open position and lockable at a preselected angle. When the main frame including the receipt tray is opened to and locked at a preselected angle, one roller of a roller pair is released from the other roller.

Japanese Patent Laid-Open Publication No. 9-292742 discloses an ADF including a single receipt tray positioned below a feed tray and available for both of the one-side mode and both-side mode.

Japanese Patent Laid-Open Publication No. 8-91711 pertains to a sheet-through type copier including a single receipt tray positioned below a feed tray and also available for both of the one-side mode and both-side mode. A reversal path assigned to the both-side mode and a roller pair for nipping the edge of a document whose one side has been scanned are arranged in the vicinity of a scanning position.

Likewise, Japanese Patent Laid-Open Publication No. 9-6063 discloses an ADF including a single receipt tray positioned below a feed tray and shared by the one-side mode and both-side mode. This ADF does not include a switchback path for reversing, in the one-side mode, documents scanned in order to drive them out in order of page.

Further, Japanese Patent Laid-Open Publication No. 10-20568 teaches an ADF including a first receipt tray positioned below a feed tray, first conveying means for conveying a document scanned to a switchback path below the first receipt tray, second conveying means for driving the document out of the switchback path, an extendible second receipt tray mounted on the outer periphery of the ADF, and a path selector for selecting one of a plurality of paths including the switchback paths. In the usual one-side mode, documents of size A3 or similar large size are delivered to the second receipt tray. If the second receipt tray is not sufficiently extended, such documents are delivered to the first receipt tray and prevented from dropping thereby.

Laid-Open Publication Nos. 11-292374, 8-11-662, 6-242648 and 5-6053 stated above each need two receipt trays or a feed tray protruding from the side wall of the ADF. However, the two receipt trays or the protruding feed tray occupies an extra space in addition to the space of the ADF itself.

Laid-Open publication No. 9-292742 has a problem that the path at the discharging side is sophisticated and needs a great number of parts, resulting in an increase in cost. Laid-Open Publication No. 9-6063, as well as 9-292742, cannot convey the next document to the scanning position until the preceding document has been driven out to the receipt tray, obstructing rapid conveyance. Laid-Open Publication No. 8-91711 pertains to a configuration in which a document is conveyed to a glass platen and stopped there, but does not even suggest an implementation for rapid conveyance.

A problem with Laid-Open Publication No. 5-6053 is that when the movable main frame is opened for the removal of a jamming sheet, impurities including dust are apt to enter the ADF.

Laid-Open Publication No. 10-20568 gives no consideration to a configuration in which when a document scanned is driven out to the first receipt tray via the switchback path, the next document is brought to a stop on the glass platen. Further, the first and second conveying means (drive rollers) are associated with the switchback path while the second receipt tray is mounted on the outer periphery of the ADF. This obstructs small size, space saving construction.

Assume that the ADF includes a stamp unit in addition to the two receipt trays. Then, a top cover, for example, protrudes above the ADF and again obstructs small size, space saving construction.

SUMMARY OF THE INVENTION

It is an object of the present invention to provide an ADF including a single receipt tray positioned below a feed tray and shared by the one-side mode and both-side mode for thereby promoting rapid conveyance, and an image forming apparatus including the same.

It is another object of the present invention to provide an ADF allowing a document jamming a discharge path to be easily removed, and an image forming apparatus Including the same.

It is a further object of the present invention to provide a simple, space saving ADF, and an image forming apparatus including the same.

an ADF of the present invention includes a feed tray configured to allow documents to be stacked thereon with front sides facing upward. A receipt tray is positioned below the feed tray, but above a scanning position, and configured to allow each document having one side or both sides scanned at the scanning position to be driven out to the receipt tray. The receipt tray is angularly movable such that its outlet side thereof opens. A feeding section sequentially feeds the top document to the bottom document stacked on the feed tray one by one while separating each document from the underlying documents. A first conveying section reverses the document fed by the feeding section and conveys it to the scanning position. A second conveying section conveys the document from the scanning position to a shared path available for both of the one-side scanning mode and both-side scanning mode, reverses the document, and again conveys the document to the scanning position. A switchback conveying section conveys the document reversed by the second conveying section via the shared path to a switchback path below the receipt tray. A guide is constructed integrally with the receipt tray for reversing the document driven out of the switchback path by the switchback conveying section in the reverse direction toward an outlet via the shared path. A third conveying section conveys the document conveyed from the scanning position toward the outlet via the shared path to the receipt tray. Switching members steer the document toward one of the shared path, the switchback path and a reversal path along which the document reversed after scanning is again brought to the scanning position. A cover covers part of the second conveying means, guide means and switching members to thereby delimit the shared path. The cover is angularly movable for uncovering the shared path. A controller causes the switching members to steer, in the both-side scanning mode, the document whose both sides have been scanned toward the shared path or to steer, in the one-side scanning mode, the document whose one side has been scanned toward the switchback path.

An image forming apparatus including the above ADF is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
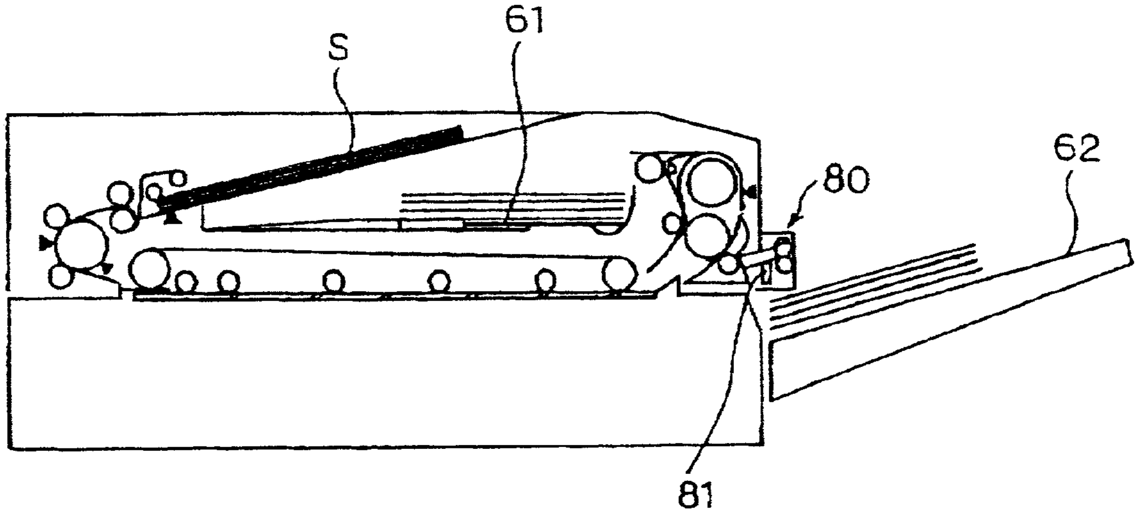
FIG. 1 PRIOR ART
FIG. 1 is a section showing a conventional ADF including a plurality of receipt trays.

To better understand the present invention, brief reference will be made to the ADF taught in the previously mentioned Laid-Open Publication No. 11-292374, shown in FIG. 1. As shown, the ADF includes two receipt trays 61 and 62 for receiving documents S driven out of the ADF. The receipt tray 61 is mounted on the top of the ADF while the receipt tray 62 is mounted on the document outlet side of the ADF in a horizontal position. In the one-side mode for reading only one side of each document S, the documents S are sequentially driven out to the receipt tray 62. In the both-side mode for reading both sides of each document S, the documents S are sequentially driven out to the receipt tray 61. With this configuration, the ADF stacks the documents S on the tray 61 or 62 in order of page while increasing document conveying speed. In the case where the ADF includes a "copied" stamper 81, a stamper unit 80 protrudes to the outside through part of an upper cover adjoining the receipt tray 62.

Figure 2:
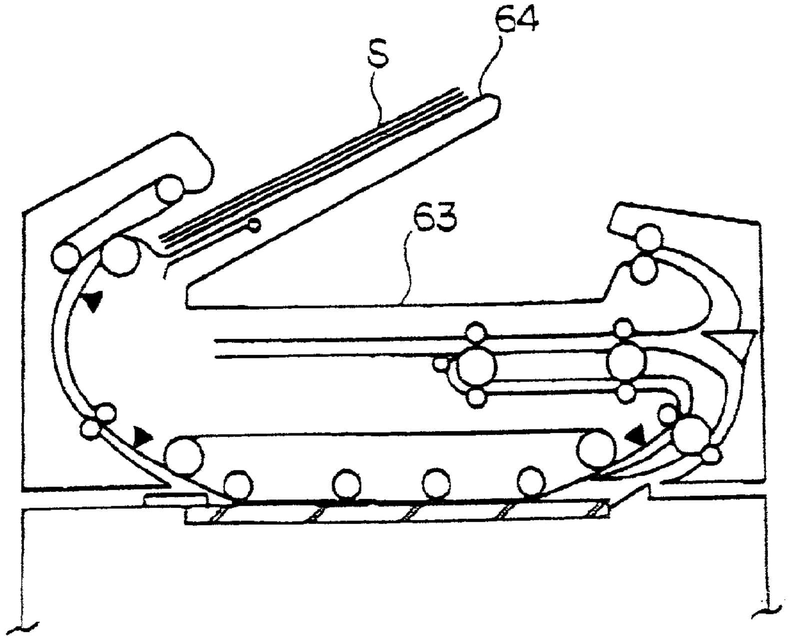
FIG. 2 PRIOR ART
FIG. 2 is a section showing another conventional ADF including a single receipt tray.

FIG. 2 shows the ADF disclosed in the previously mentioned Laid-Open Publication No. 9-292742. As shown, the ADF includes a single receipt tray 63 positioned below a feed tray. Documents S driven out of the ADF are stacked on the receipt tray 63 in both of the one-side mode and both-side mode. More specifically, in the both-side mode, after one side of each document S has been scanned, the document S is conveyed away from a scanning position. Subsequently, second conveying means reverses the document S and again conveys it to the scanning position. After the other side of the document S has been scanned, the document S is conveyed away from the scanning position, reversed, and then conveyed to the scanning position, but not scanned. Finally, third conveying means switches back the document S toward the receipt tray 63.

The conventional ADFs described above each have some problems left unsolved, as discussed earlier.

Preferred embodiments of the ADF and image forming apparatus in accordance with the present invention will be described hereinafter.

First Embodiment

Figure 3:
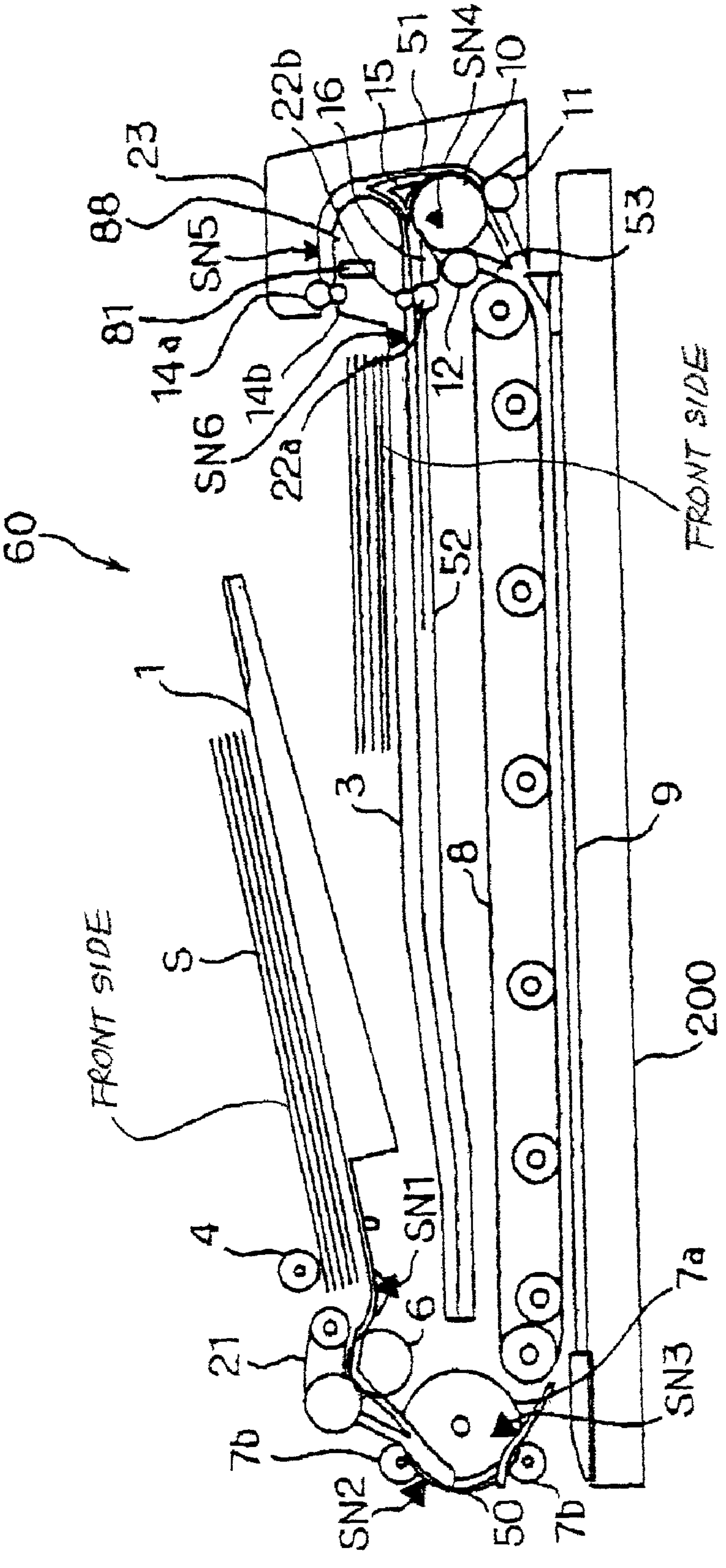
FIG. 3 is a section showing an image forming apparatus embodying the present invention.
Figure 4A:
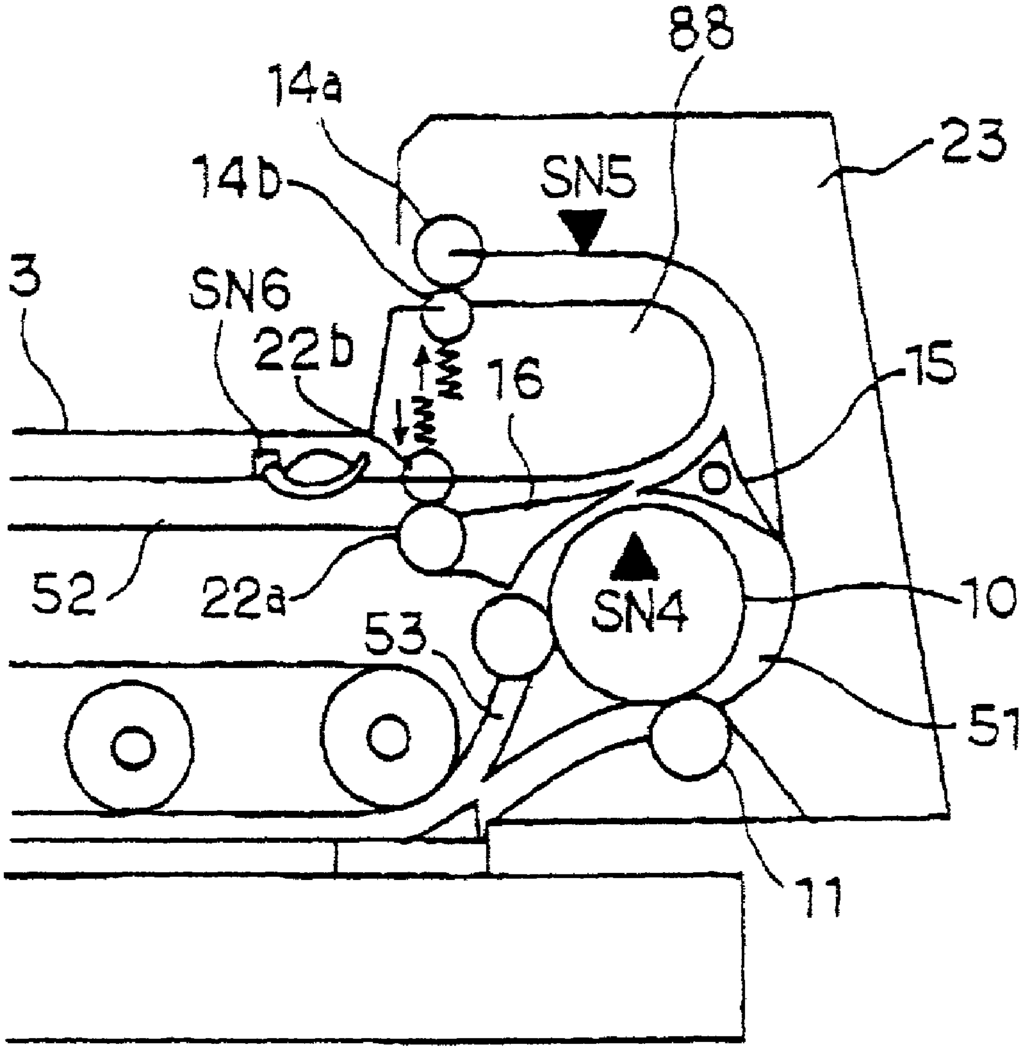
FIGS. 4A and 4B are sections showing essential part of the illustrative embodiment.
Figure 4B:
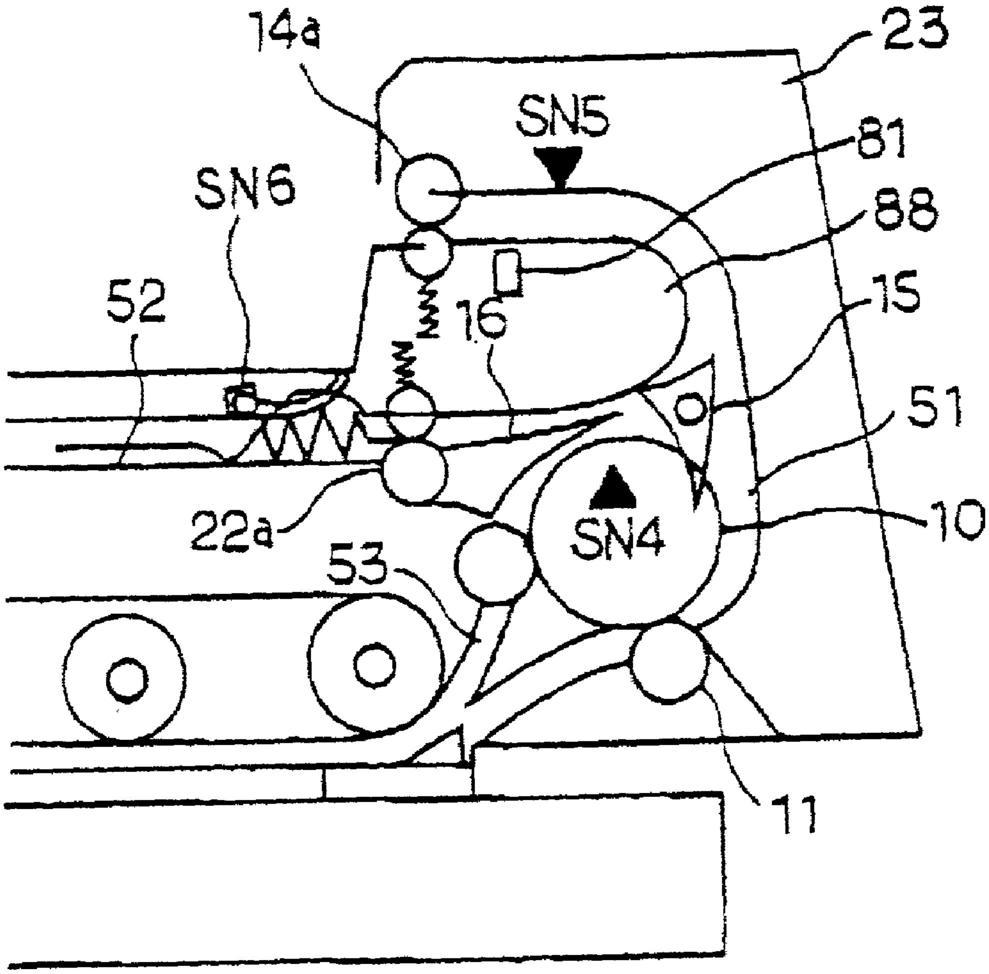
Figure 5:
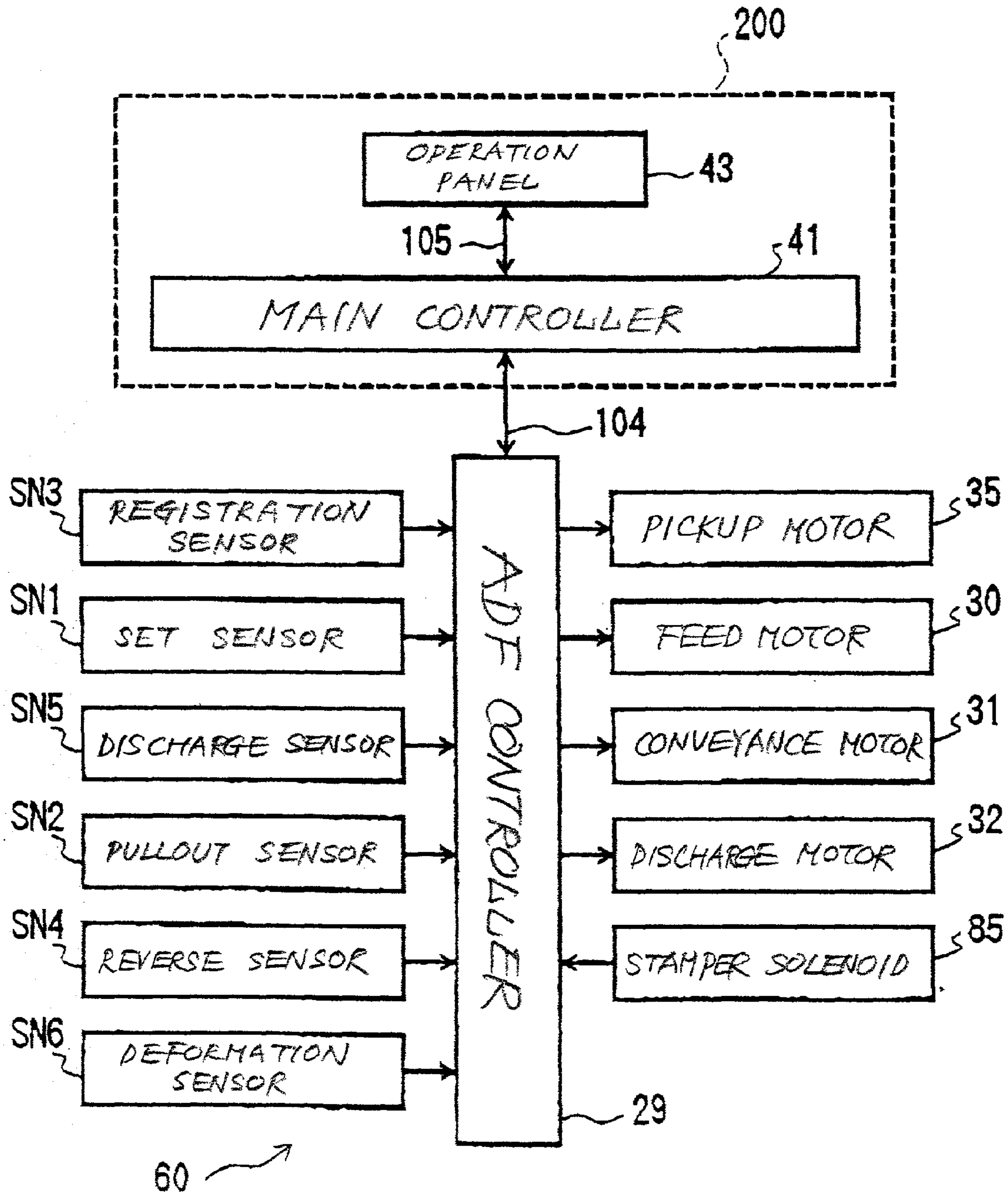
FIG. 5 is a block diagram showing a control system included in the illustrative embodiment.

Referring to FIGS. 3 through 5, an image forming apparatus embodying the present invention will be described. As shown, the ADF, generally 60, is mounted on the apparatus body 200 of the image forming apparatus and generally made up of a feeding section, a conveying section, and a reversing/discharging section. A feed motor 300, a conveyance motor 31 and a discharge motor 32 are respectively assigned to the above three sections. The ADF 60 includes a feed tray 1, a receipt tray 3, a pickup roller 4, a belt 21, a reverse roller 6, pullout rollers 7*a* and 7*b*, a belt 8, and a glass platen 9. The ADF 60 further includes a first discharge drive roller 10, a first discharge driven roller 11, a reverse/discharge roller 12, a second discharge drive roller 14*a*, a second discharge driven roller 14*b*, an outlet guide 88, a first path selector 15, a second path selector 16, a switchback drive roller 22*a*, and a switchback driven roller 22*b*. The ADF 60 additionally includes a set sensor SN1, a pullout sensor SN2, a registration sensor SN3, a reversal sensor SN4, a discharge sensor SN5, a "copied" stamper 81, and a deformation sensor SN6.

Documents S are stacked on the feed tray 1 face up. The pickup roller 4 sequentially pays out the documents S stacked on the feed tray 1 from the top to the bottom of the stack. The belt 21 and reverse roller 6 cooperate to separate the top document S paid out from the feed tray 1 from the underlying documents S.

The discharge drive roller 10 and discharge driven roller 11 cooperate to convey the document S from a scanning position to a shared path available for both of the one-side mode and both-side mode (including a path 51). The rollers 10 and 11 then reverse the document S and again convey it to the scanning position. The switchback drive roller 22*a* and switchback driven roller 22*b* convey the document S reversed by the discharge rollers 10 and 11 via the shared path to a switchback path below the receipt tray 3 (including a path 52). The second discharge drive roller 14*a* and second discharge driven roller 14*b* convey the document S brought thereto by the discharge rollers 10 and 11 via the shared path to the receipt tray 3 via an outlet.

The document reversed after scanning may be again conveyed to the scanning position via a reversal path including a path 53. The first path selector 15 and second path selector 16 selectively steer the document S to one of the shared path, switchback path and reversal path. The path selectors 15 and 16 each have a comb-like edge. When the document S scanned should be again conveyed to the scanning position, the comb-like edges of the path selectors 15 and 16 intersect each other.

The outlet guide 88 is molded integrally with the receipt tray 3. When the switchback drive roller 22*a* rotates in the reverse direction to drive the document S out of the switchback path, the outlet guide 88 reverses the document S and guides it to the outlet via the shared path. The receipt tray 3 is positioned only below the feed tray 1 and available for both of the one-side mode and both-side mode.

The stamper 81 is mounted on part of the outlet guide 88 adjoining the receipt tray 3. When a stamper solenoid 85 (see FIG. 5) is turned on, it actuates the stamper 81 to stamp "copied" on the document S scanned.

The deformation sensor SN6 senses a condition in which the document S entered the path 52 is pressed to deform in the form of bellows, i.e., a jam. The document sensor SN6 is mounted on an upper guide delimiting the path 52. More specifically, as shown in FIG. 4A, the upper guide is formed with a recess that is about 4 mm deep. As shown in FIG. 4B, when the document S deformed in the form of bellows fills the above recess, it raises a feeler included in the deformation sensor SN6. As a result, the deformation sensor SN6 senses a jam.

An outlet cover 23 encloses part of the discharge drive roller 10, outlet guide 88, path selectors 15 and 16, delimiting the shared path. The outlet cover 23 is openable to uncover the shared path.

As shown in FIG. 4A, the second discharge driven roller 14*b* and switchback driven roller 22*b* are constantly biased upward and downward, respectively, by springs. When the outlet cover 23 is closed, the discharge drive roller 14*a* mounted on the outlet cover 23 presses the discharge driven roller 14*b*. At the same time, the receipt tray 3 is forced downward, as viewed in FIG. 4A, by the spring. Further, when the receipt tray 3 is forced downward, the switchback driven roller 22*b* biased by the spring downward presses the switchback drive roller 22*a*. Therefore, when the outlet cover 23 is closed, it sets up conveyance pressure or nip pressure between the discharge drive roller 14*a* and the discharge driven roller 14*b* and between the switchback driven roller 22*b* and the switchback drive roller 22*a*. Further, when the outlet cover 23 is closed, a gear, not shown, mounted on the discharge drive roller 14*a* is brought into mesh with a gear, not shown, mounted on a drive shaft, not shown, which is included in the apparatus body.

FIG. 5 shows a control system included in the illustrative embodiment. As shown, the apparatus body 200 includes a main controller 41 for controlling the entire apparatus and an operation panel 43. The main controller 41 receives various signals from the ADF 60 via communication means 104. In response, the main controller 41 controllably drives the document scanning section and controls display on the operation panel 43. Further, the main controller 41 sends mode signals, a feed start signal and other various control signals to the ADF 60 in accordance with the input signals. The mode signals include a signal indicative of the one-side mode or the both-side mode.

Various buttons including a copy start button and various keys including numeral keys are arranged on the operation panel 43 together with an LCD (Liquid Crystal Display) and indicators. The operator of the apparatus is capable of inputting various commands including a start/stop command on the operation panel 43, as desired.

The ADF 60 includes an ADF controller 29 that receives the outputs of the sensors SN1 through SN6 and status signals output from the motors 30 through 32. In addition, the ADF controller 29 receives the various control signals from the main controller 41 via the communication means (serial communication line) 104. The ADF 60 transfers information received from the sensors N1 through N6 to the main controller 41 and drives the stamper solenoid 85 and motors 30 through 32 and 35 in accordance with the control signals received from the main controller 41.

The motors 30 through 32 and 35 each are implemented as a stepping motor. An amount by which a stepping motor should be driven can be easily determined by, e.g., counting pulses and multiplying the count by an amount of drive for a single pulse. The length of a document is determined on the basis of the amount of drive and the outputs of the sensors SN1 through SN6. Also, the amount of drive and sensor outputs are used to control the interval between consecutive documents, the timing at which a document should arrive at the reading position after the detection of registration, and the timing for ending scanning.

The main controller 41 includes a RAM (Random Access Memory), not shown, for storing, e.g., modes input on the operation panel 43. Every time the modes are changed, the RAM updates data stored therein.

In the both-side mode, the main controller 41 and ADF controller 29 switch the positions of the two path selectors

15 and 16 such that the document S having its both sides scanned enters the path 51. In the one-side mode, the main controller 41 and ADF controller 29 cause the path selectors 15 and 16 to steer the document S having its one side scanned into the path 52.

Figure 6:
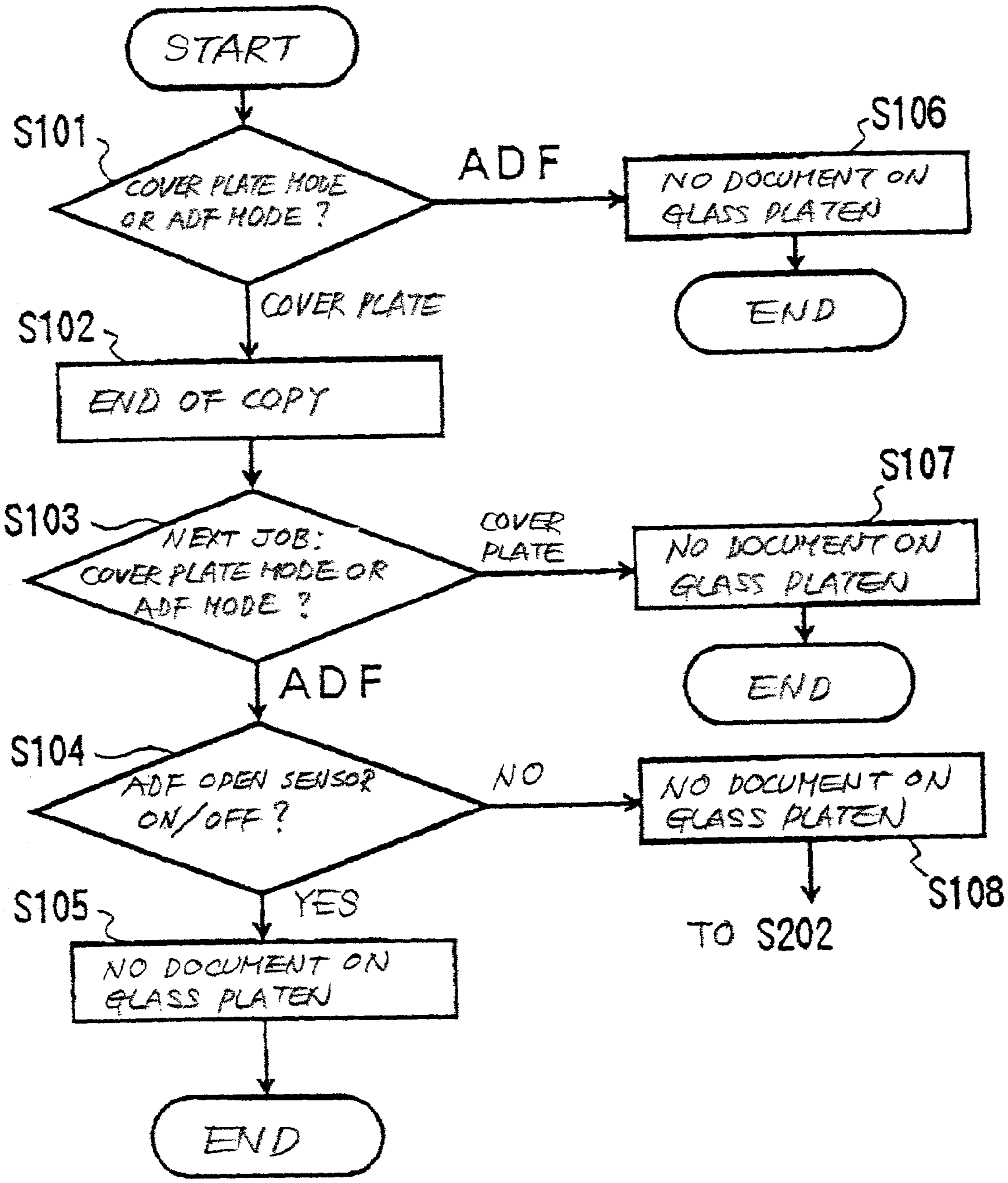
FIGS. 6 and 7 are flowcharts demonstrating a specific operation unique to the illustrative embodiment.

Reference will be made to FIG. 6 for describing how the illustrative embodiment determines whether or not the operator has forgotten to remove the document S from the glass platen 9. As shown, when the operator has selected a cover plate mode, the operator opens the ADF 60 after copying in order to remove the document S. At this instant, an ADF open sensor, not shown, sends a signal representative of the open position of the ADF 60 to the ADF controller 29. However, when the operator inadvertently leaves the document S on the glass platen 9 after copying, the ADF open sensor does not send the above signal to the ADF controller 29. Therefore, after copying in the cover plate mode and if the ADF open sensor does not sense the open position of the ADF 60 despite that the next job is an ADF mode, the ADF controller 29 determines that the document S is left on the glass platen 9.

Figure 7:
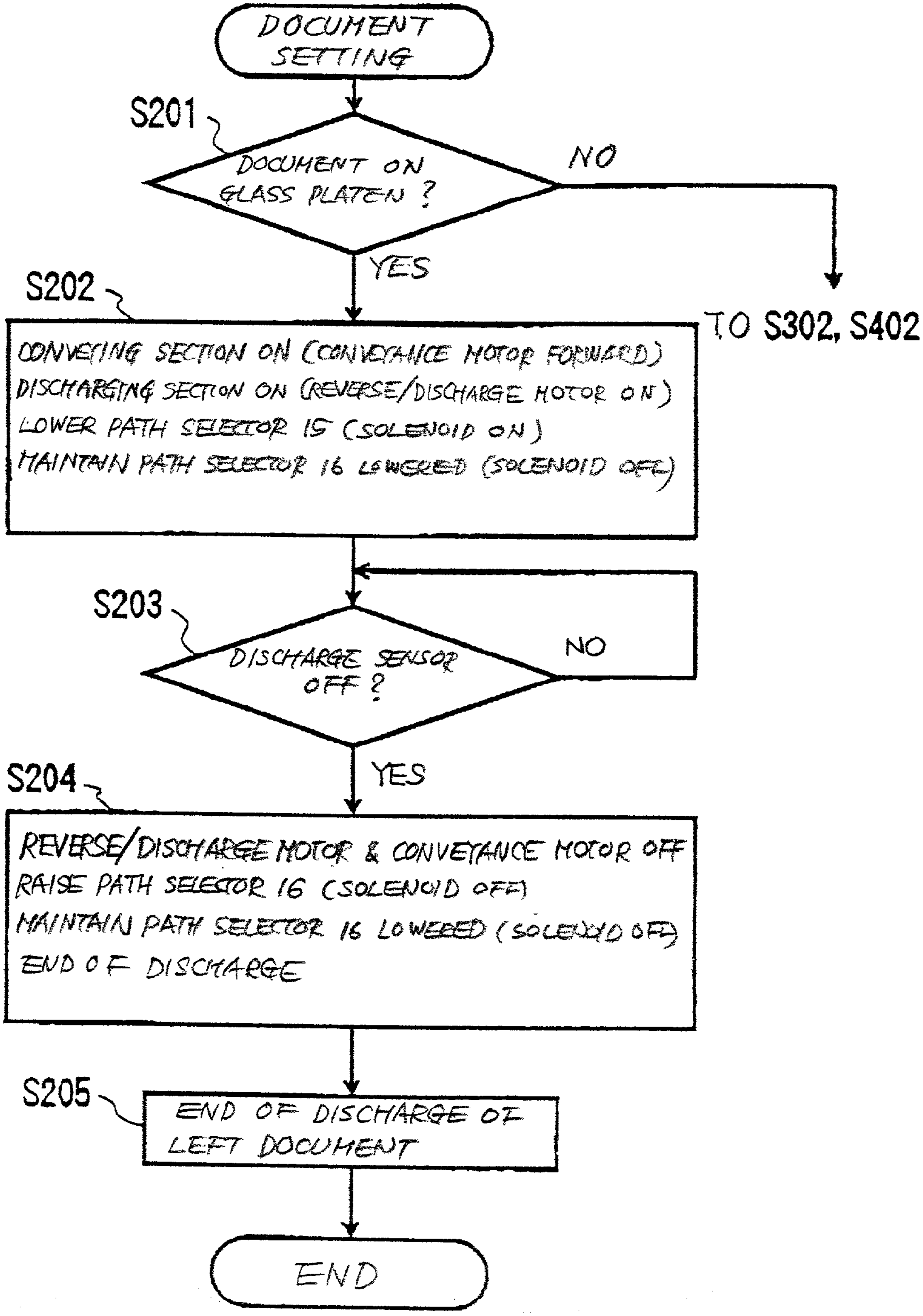

FIG. 7 demonstrates a procedure to be executed when the document S is left on the glass platen 9 after, e.g., cover plate mode operation. Assume that the document S is left on the glass platen 9 after, e.g., cover plate mode operation. The operator sets the documents S on the feed tray 1 with the front sides facing upward in the one-side mode or the both-side mode and then presses the copy start button on the operation panel 43. In response, the document S is conveyed from the document tray 1 to the conveying section via a first path 50, FIG. 3. At the same time, the conveyance motor 31 rotates in the forward direction to cause the belt 8 to convey the document S left on the glass platen 9 toward the outlet of the ADF 60.

Figure 8:
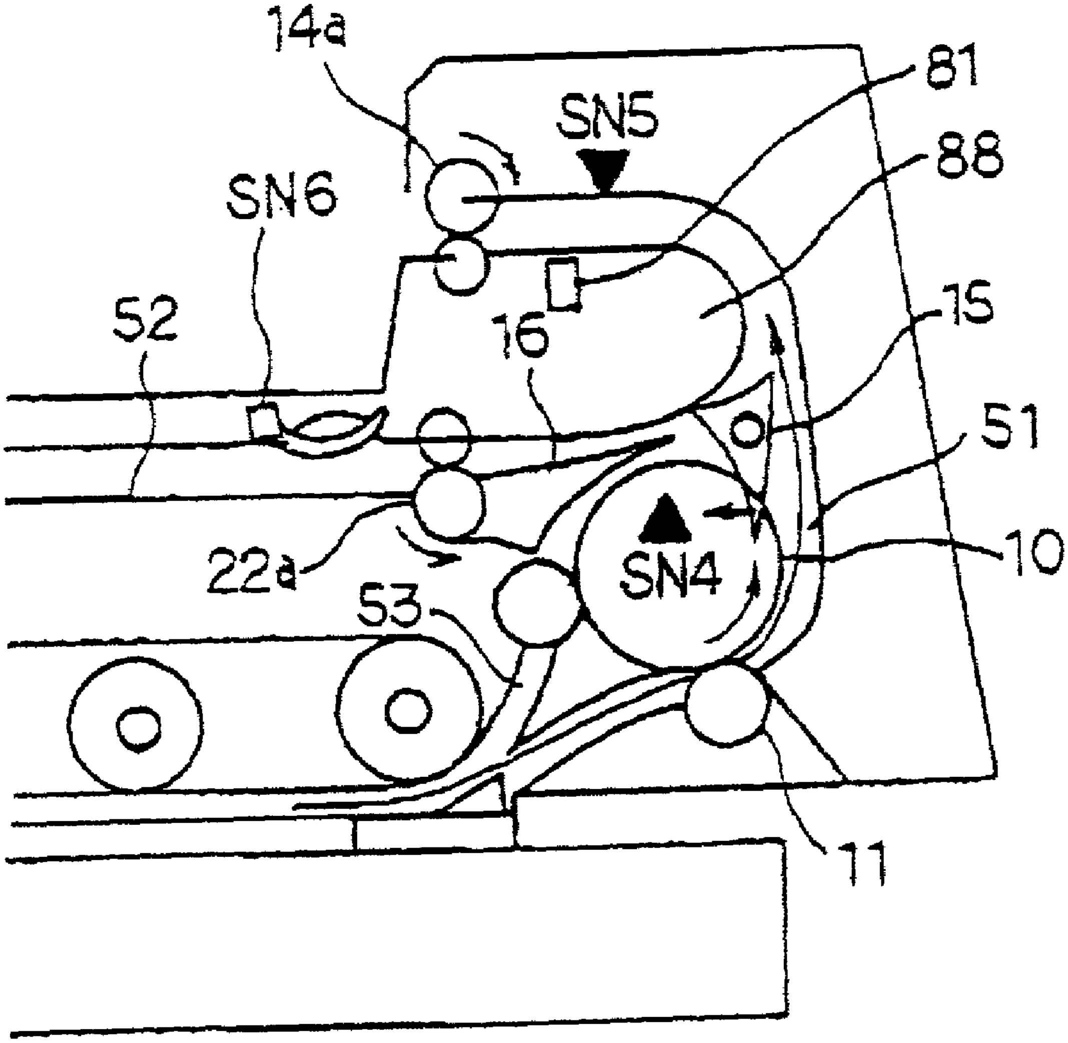
FIG. 8 is a section demonstrating the movement of path selectors included in the illustrative embodiment.

A reverse/discharge motor, not shown, rotates in the forward direction at the same time as the conveyance motor 31. At this instant, as shown in FIG. 8, a solenoid, not shown, switches the position of the first path selector 15 downward to a retracted position, as indicated by an arrow. In this position, the path selector 15 guides the document S brought thereto by the first discharge drive roller 10 to the path 51 instead of the path 52. The document S therefore reaches the discharge rollers 14*a* and 14*b* via the discharge sensor SN5. The discharge rollers 14*a* and 14*b* drive the document S out of the ADF 60 to the receipt tray 3 with the front side facing upward, i.e., in a position opposite to the usual position shown in FIG. 3.

Figure 9:
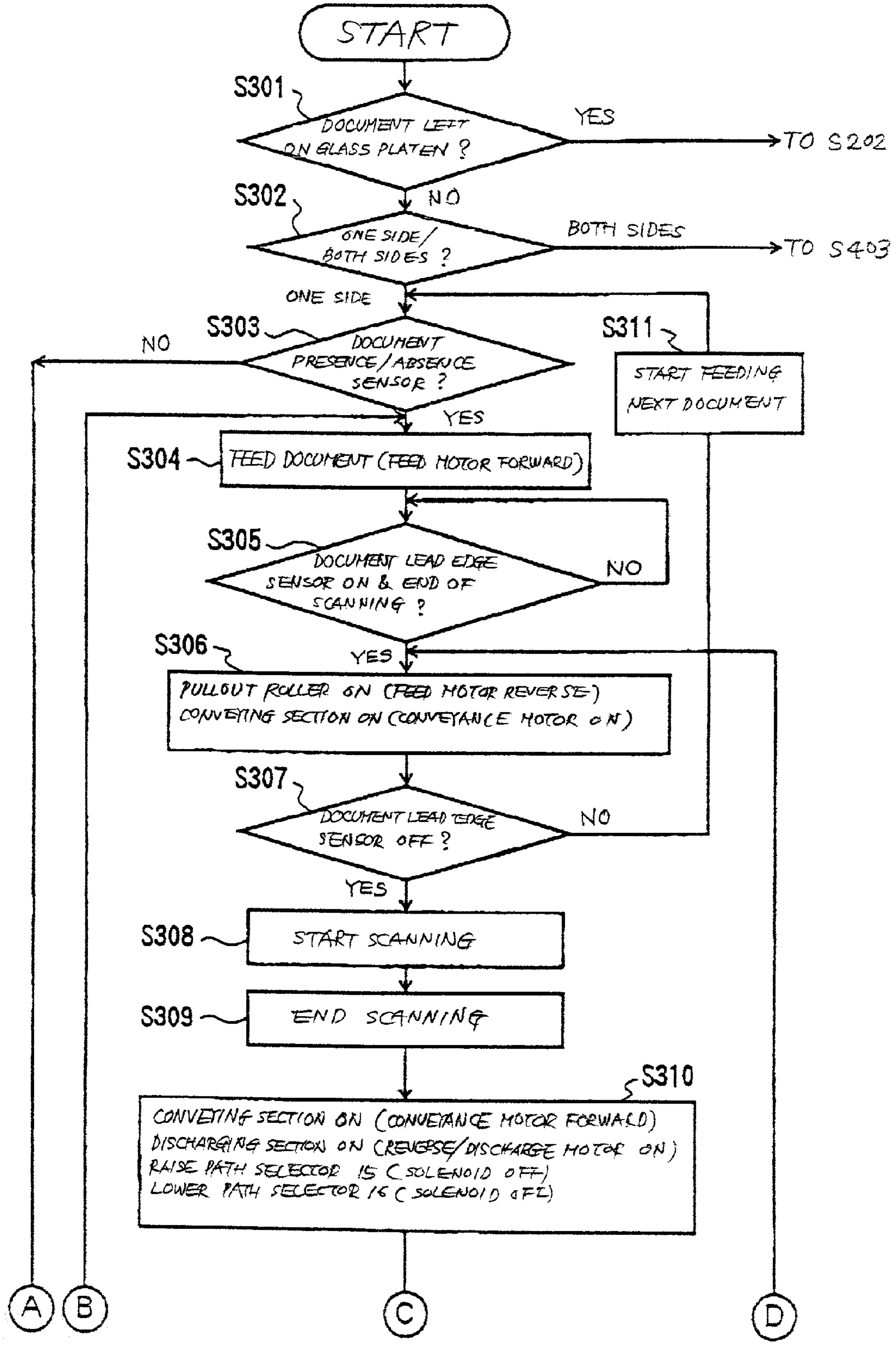
FIG. 9 is a flowchart showing part of a specific operation of the illustrative embodiment in the one-side mode.
Figure 10:
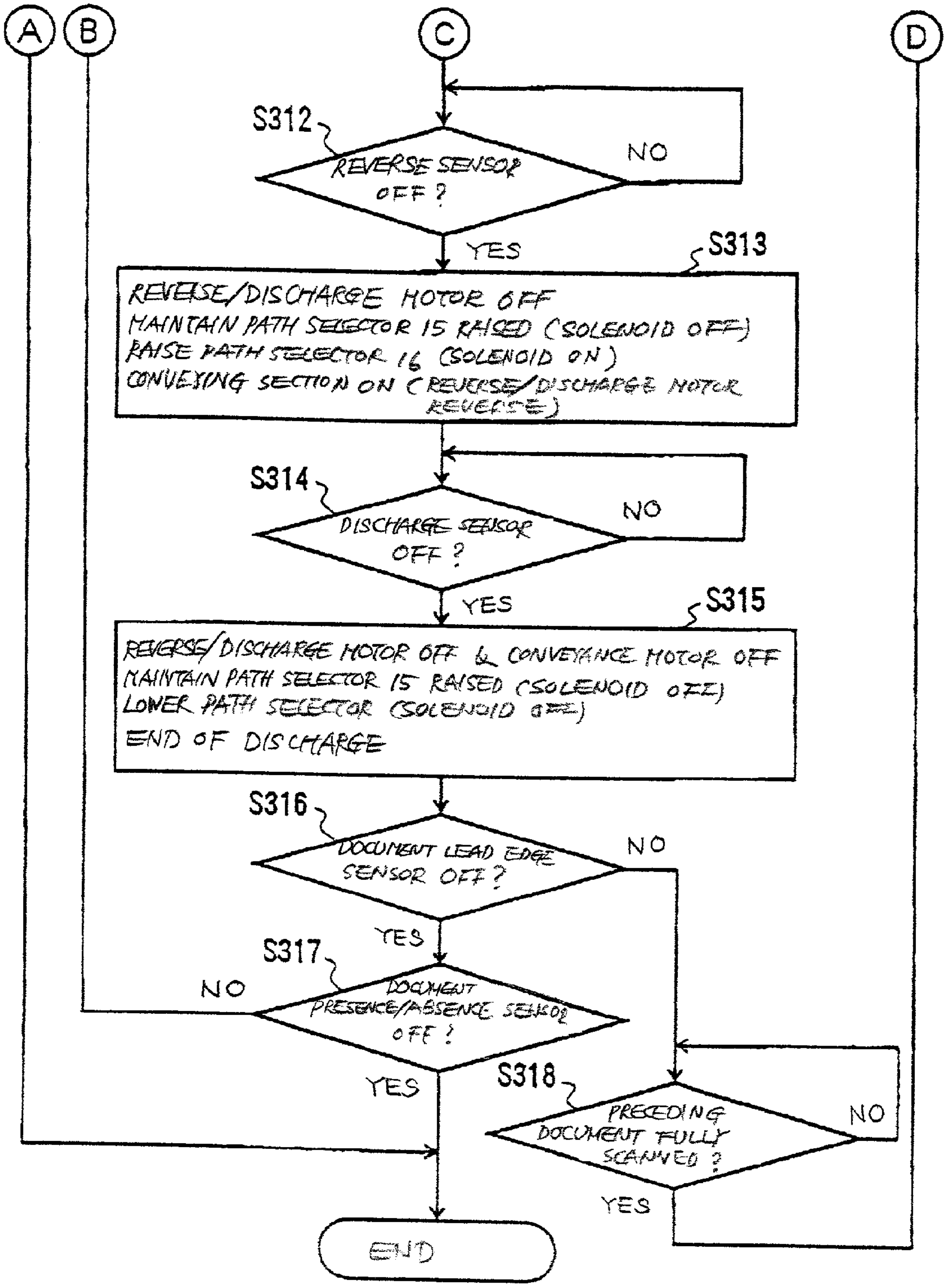
FIG. 10 is a flowchart showing the other part of the same operation.

The operation of the illustrative embodiment in the one-side mode will be described with reference to FIGS. 9 and 10. Assume that a document is not left on the glass platen 9, and that the operator sets a stack of one-sided documents on the feed tray 1 face up. Then, when the operator presses the copy start button on the operation panel 43, the feed motor 30 rotates in the forward direction (clockwise). As a result, the pickup roller 4, belt 21 and the pullout drive roller 7*a* rotate in the forward direction while the reverse roller 6 rotates in the reverse direction. The pickup roller 4 pays out the top document S from the feed tray 1 toward a separating portion where the belt 21 and reverse roller 6 are positioned. The belt 21 and reverse roller 6 separate the top sheet paid out from the underlying documents S and drive the former to the first path 50. The pullout drive roller 7*a* and pullout driven roller 7*b* pull out the document S from the separating portion.

When the registration sensor SN3 senses the leading edge of the document S, the feed motor 30 rotates in the reverse direction (counterclockwise). This causes the pickup roller 4 and belt 21 to stop rotating via a driveline while causing the pullout drive roller 7*a* and reverse roller 6 to rotate in the forward direction and reverse direction, respectively. As a result, the next document S is prevented from entering the separating portion. In this condition, the pullout rollers 7*a* and 7*b* reverse the single document S and drive it toward the conveying section via the first path 50. The conveyance motor 31 rotates in the forward direction at the same time as the feed motor 30 rotates in the reverse direction, causing the belt 8 to convey the document S to the glass platen 9. Assume that the registration sensor SN3 senses the trailing edge of the document S being conveyed by the belt 8. Then, after the conveyance motor 31 has conveyed the document S by a preselected number of pulses, the motor 31 is turned off to stop the document S at a preselected scanning position on the glass platen 9.

As stated above, after the feed motor 30 and conveyance motor 31 have been turned off, the feed motor 30 is again rotated in the forward direction to pay out the next document S from the feed tray 1. After the registration sensor SN3 has sensed the leading edge of the next document S, the feed motor 30 conveys the document S by the preselected number of pulses. The feed motor 30 is then turned off in the same manner as in the case with the previous document.

On the other hand, the document S scanned on the glass platen 9 is driven out to the discharging section by the conveyance motor 31, i.e., belt 8.

Figure 11:
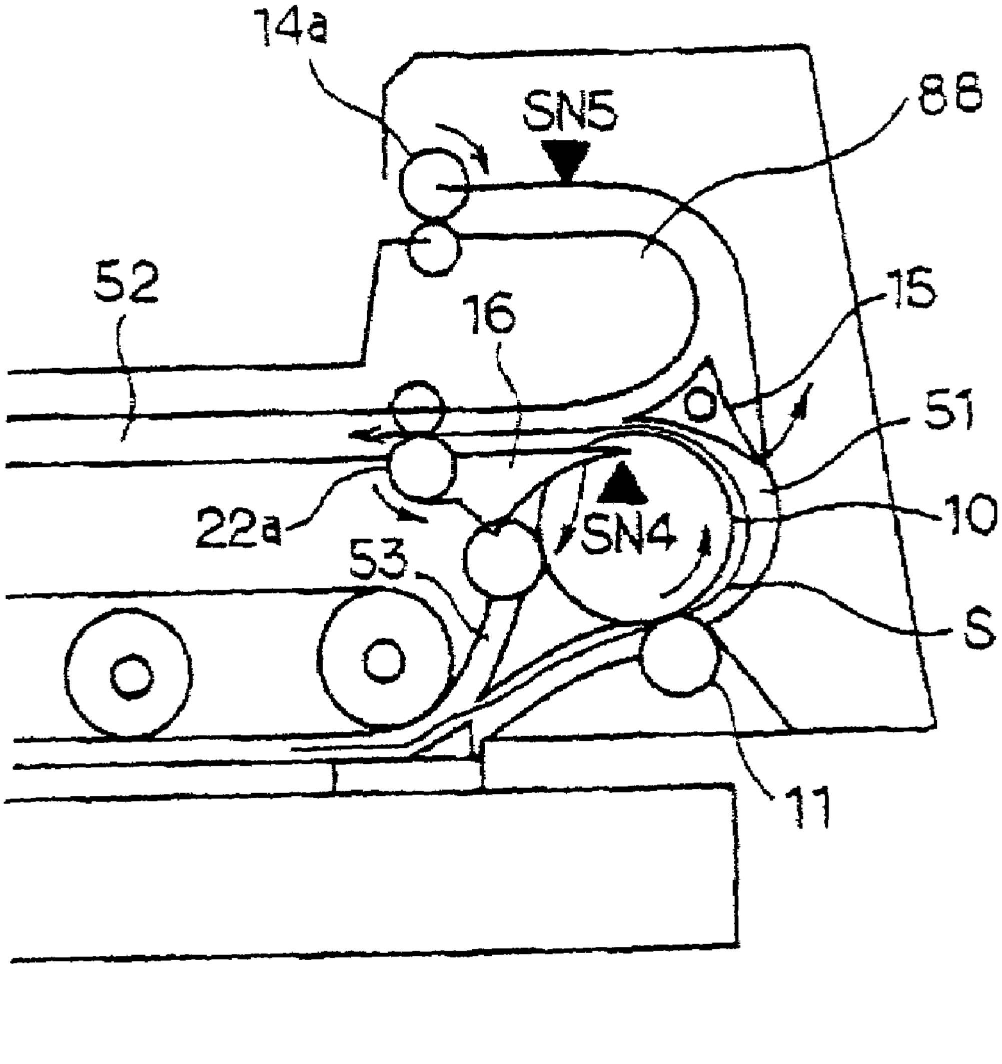
FIGS. 11 through 13 demonstrate the movement of the path selectors in the one-side mode.

As shown in FIG. 11, in a simplex copy mode for forming an image on one side of a sheet, the first path selector 15 is held in a home position retracted upward, as indicated by an arrow. A reverse/discharge motor, not shown, rotates in the forward direction at the same time as the conveyance motor 31 rotates in the same direction. The document S conveyed by the first discharge drive roller 10 to the reversing/discharging section via the path selectors 15 and 16 is driven into the path 52 by the switch back rollers 22*a* and 22*b*.

Figure 12:
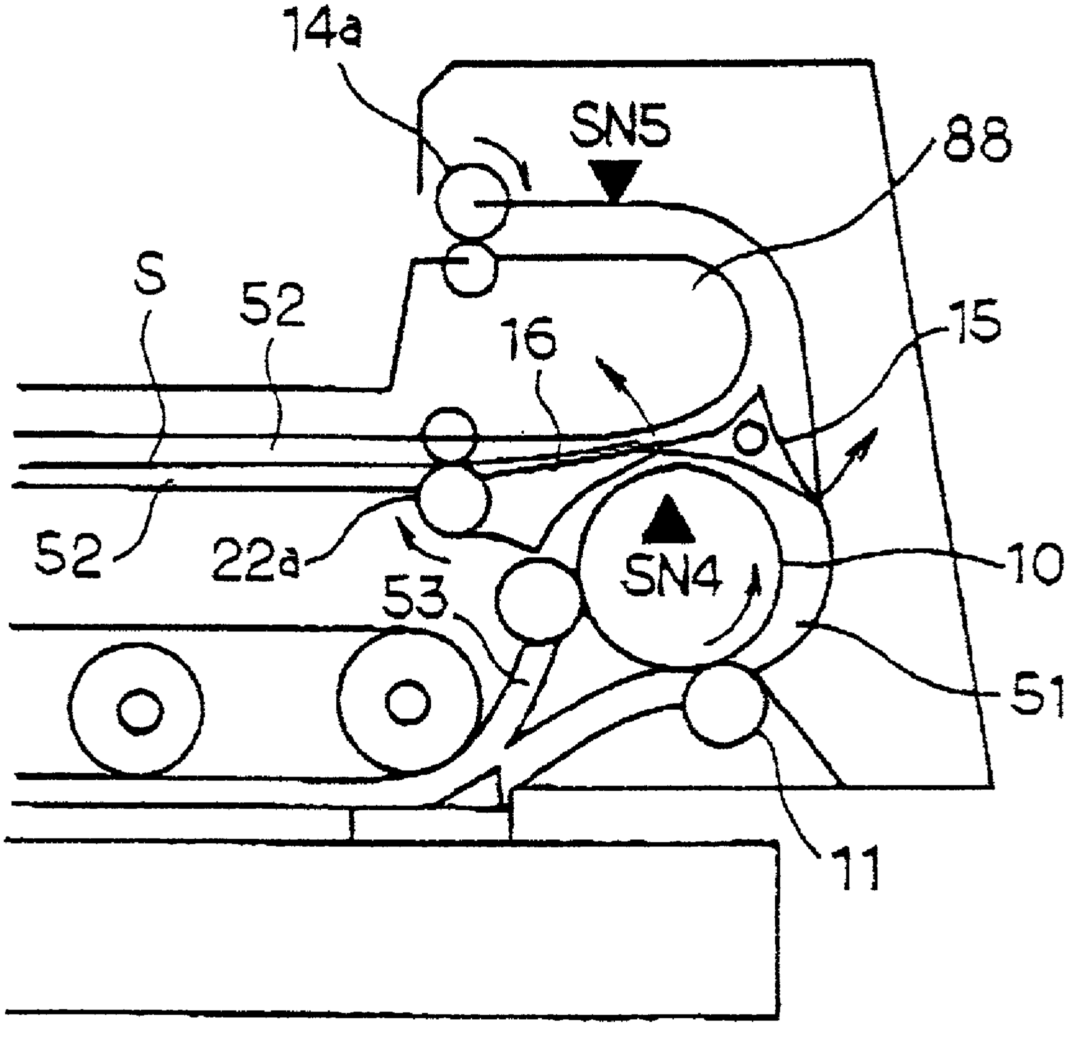
Figure 13:
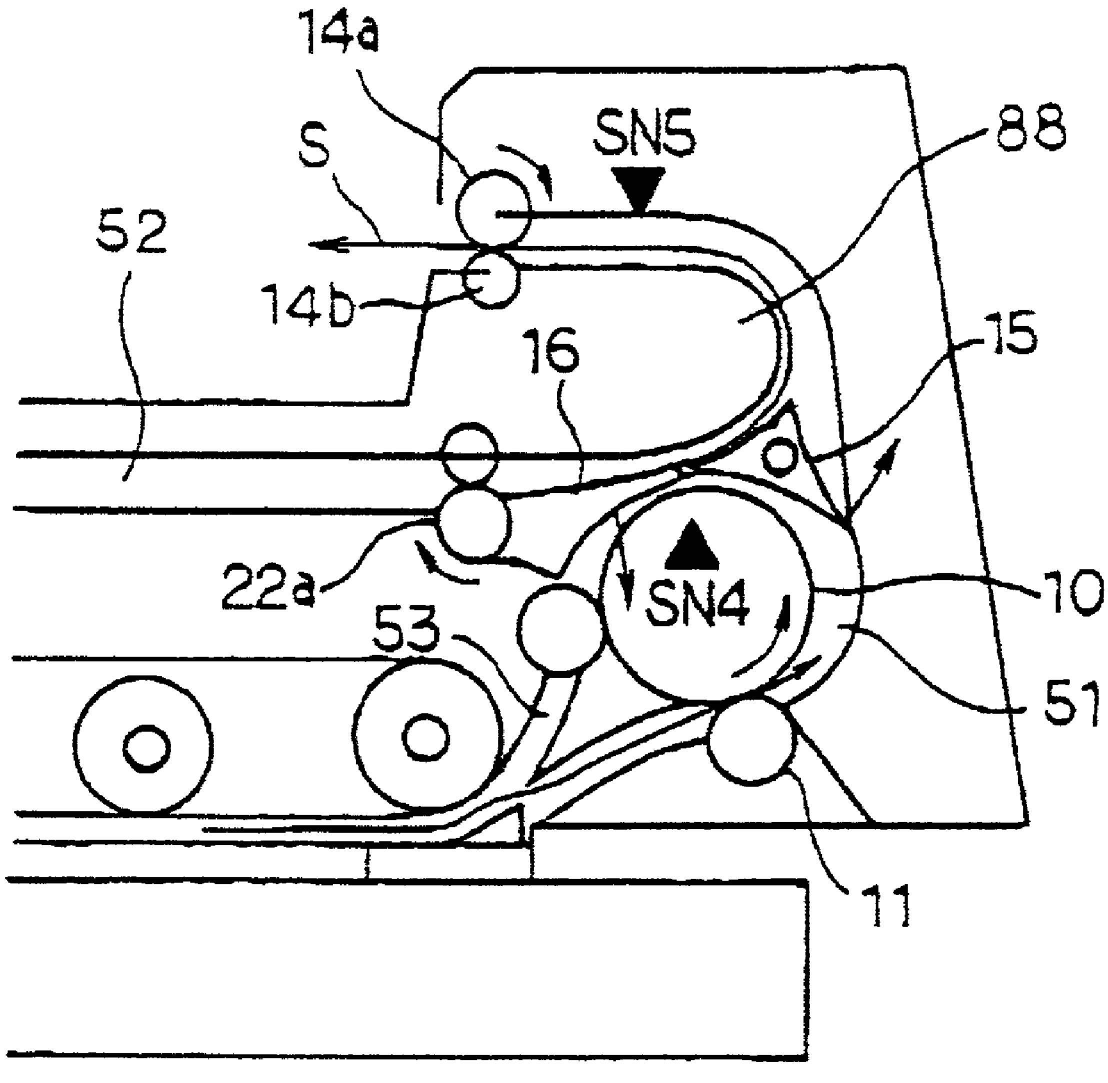

Subsequently, as shown in FIG. 12, the reversal sensor SN4 senses the trailing edge of the document S entered the path 52. As soon as the trailing edge of the document S has moved away from the path selector 15, the reverse/discharge motor is turned on in accordance with the output of the reversal sensor SN4. At this instant, a solenoid, not shown, moves the second path selector 16 from the home position (direction indicated by an arrow in FIG. 11) upward (direction indicated by an arrow in FIG. 10). The reverse discharge motor then rotates in the reverse direction to switch the rotation of the switchback drive roller 22*a* from the direction indicated by an arrow in FIG. 11 to a direction indicated by an arrow in FIG. 12, thereby conveying the document S in the direction opposite to the direction shown in FIG. 11. As a result, as shown in FIG. 13, the document S is driven out to the receipt tray 3 face down via the discharge sensor SN5 and outlet rollers 14*a* and 14*b* (FIG. 3). In this manner, the consecutive documents S are stacked on the receipt tray 3 in order of page.

When the reversal sensor SN4 senses the trailing edge of the document S, the solenoid returns the second path selector 16 to the home position (FIG. 11) in the direction indicated by an arrow in FIG. 13, preparing the path selector 16 for the next document S.

While the first document S is being conveyed to the switchback path 52, the second document S paid out is conveyed to the glass platen 9 and then scanned. After the scanning, the conveyance motor 31 again rotates in the forward direction to cause the belt 8 to convey the second document S to the discharging section. The second document S is therefore switched back and then discharged in the same manner as the first document S. Such a procedure is repeated up to the last document S.

Figure 14:
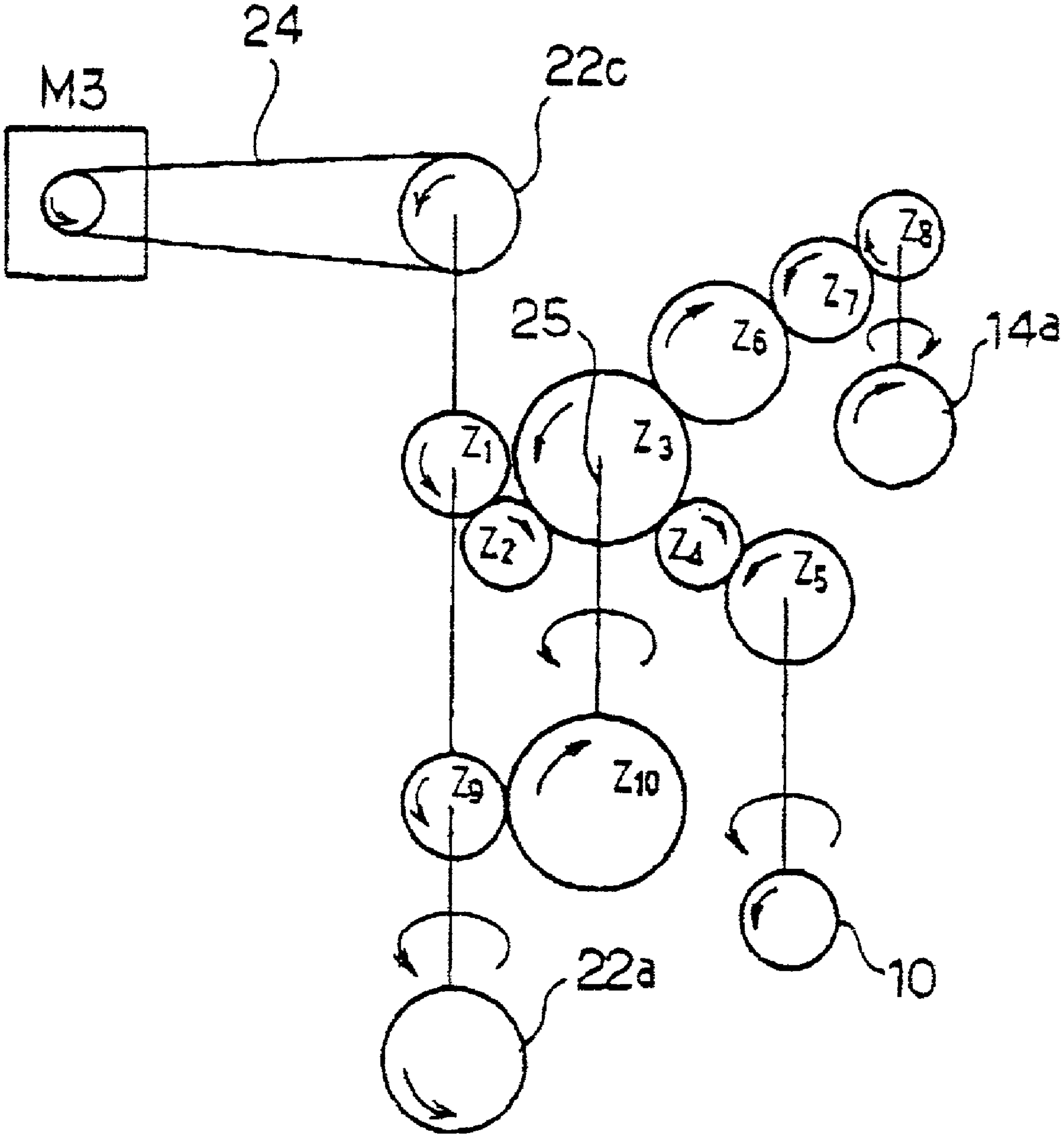
FIG. 14 shows the operation of a discharge driveline to occur when a discharge motor rotates counterclockwise.
Figure 15:
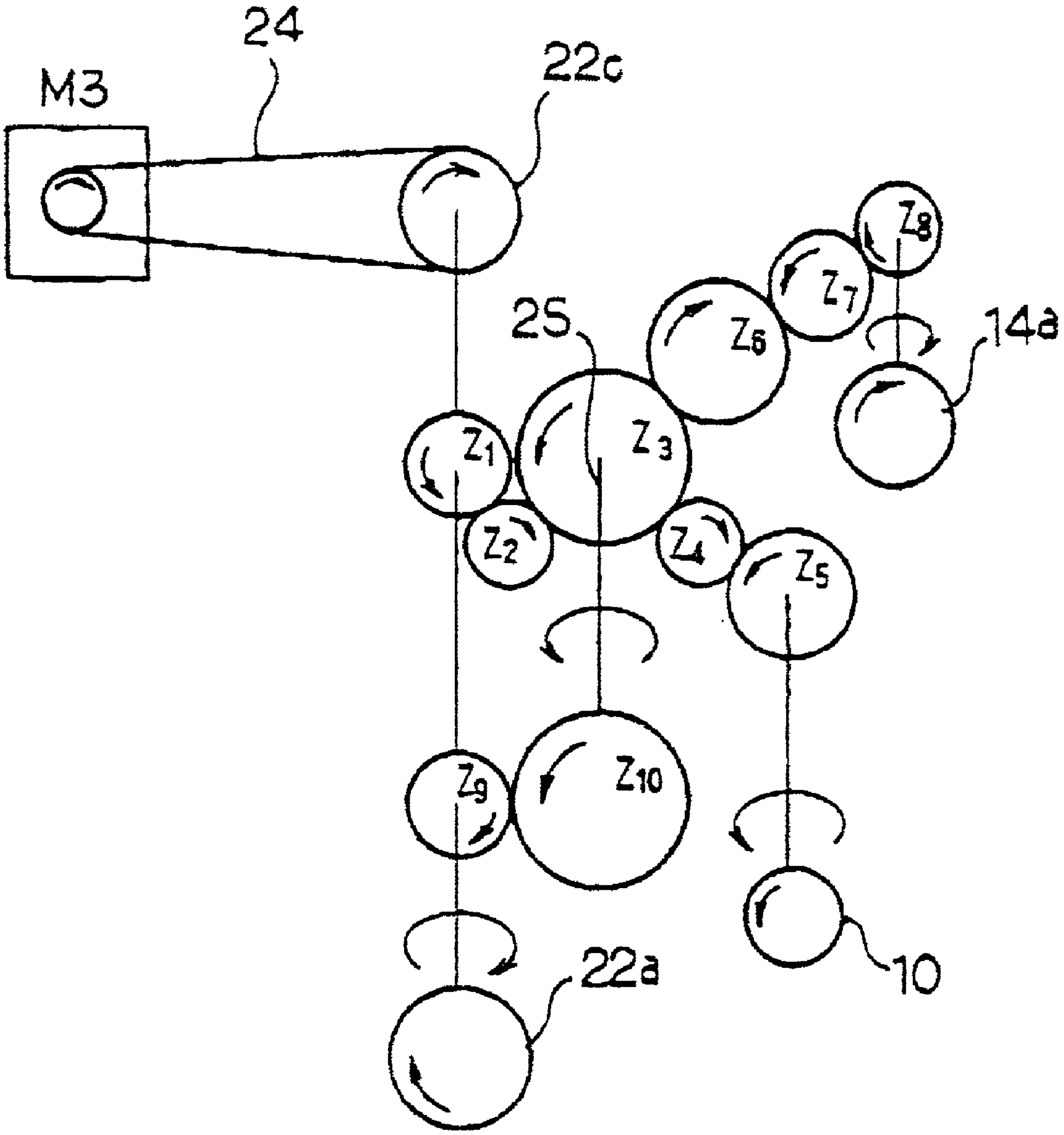
FIG. 15 shows the operation of a discharge driveline to occur when a discharge motor rotates clockwise.

FIGS. 14 and 15 demonstrate the operation of the driveline assigned to the discharging section in the one-side mode. As shown in FIG. 14, the rotation of the discharge motor 32 (M3) is transferred to a pulley 22*c* on the switchback drive roller 22*a* in the counterclockwise direction, as indicated by an arrow. At this instant, the switchback drive roller 22*a* rotates in the same direction as in FIG. 11. A gear Z9 is affixed to the switchback drive roller 22*a* and held in mesh with a gear Z10 via a one-way clutch, which is mounted on a connection drive shaft 25. A gear Z1 has a one-way clutch coaxial with the switchback drive roller 22*a*. The gear Z1 is held in mesh with a gear Z2, which is affixed to the shaft 25, via a gear Z3.

As shown in FIG. 15, assume that the discharge motor 32 (M3) causes the pulley 22*c* to rotate counterclockwise, as indicated by an arrow. Then, the gear Z1 with the one-way clutch is locked to the switchback drive roller 22*a*, causing the connection drive shaft 25 to rotate counterclockwise via the gears Z2 and Z3. However, the gear Z10 with the one-way clutch simply idles and slips on the shaft 25 when rotated in the opposite direction to the shaft 25.

Conversely, when the discharge motor 32 (M3) causes the pulley 22*c* on the switchback drive roller 22*a* to rotate clockwise, as indicated by an arrow, the roller 22*a* rotates in the same direction as in FIG. 12. The gear Z9 affixed coaxially with the roller 22*a* drives the gear Z10 via the one-way clutch of the shaft 25. Because the one-way clutch locks, the rotation of the gear Z10 is transferred to the shaft 25 and causes it to rotate counterclockwise, as indicated by an arrow. At the same time, the gear Z3 affixed to the shaft 25 drives the gear Z1 counterclockwise (opposite to the direction of rotation of the roller 22*a*) via the gear Z2. However, the gear Z1 simply idles via its one-way clutch and causes the roller 22*a* to slip.

As stated above, the switchback drive roller 22*a* selectively rotates clockwise or counterclockwise in accordance with the direction of rotation of the discharge motor 32 (M3). However, the connection drive shaft 25 always rotates in one direction (counterclockwise) without regard to the direction of rotation of the discharge motor 32.

The first discharge drive roller 10 is connected to the gear Z3, which is affixed to the connection drive shaft 25, via gears Z4 and Z5 and always rotates in one direction (counterclockwise). Likewise, the second discharge drive roller 14*a* is connected to a gear Z6, which is connected to the gear Z3, via gears Z7 and Z8 and rotates in one direction (clockwise). Therefore, while the preceding document S is conveyed to the switchback path 52 and then conveyed by the switchback drive roller 22*a*, which is reversed in the direction of rotation, out of the switchback path 52, the following document S can be conveyed toward the roller 22*a*.

Figure 16:
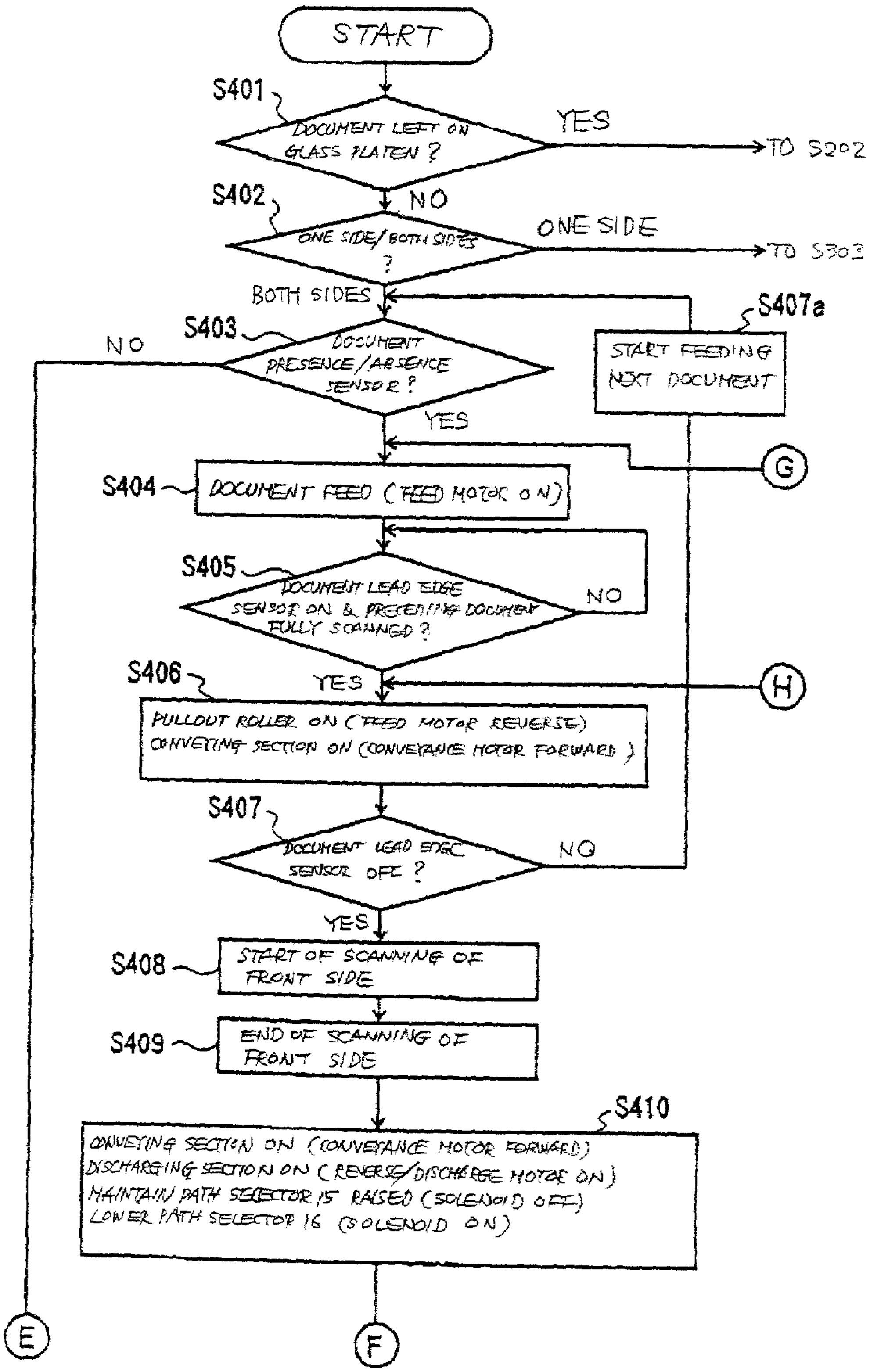
FIG. 16 is a flowchart showing part of a specific operation of the illustrative embodiment in the both-side mode.
Figure 17:
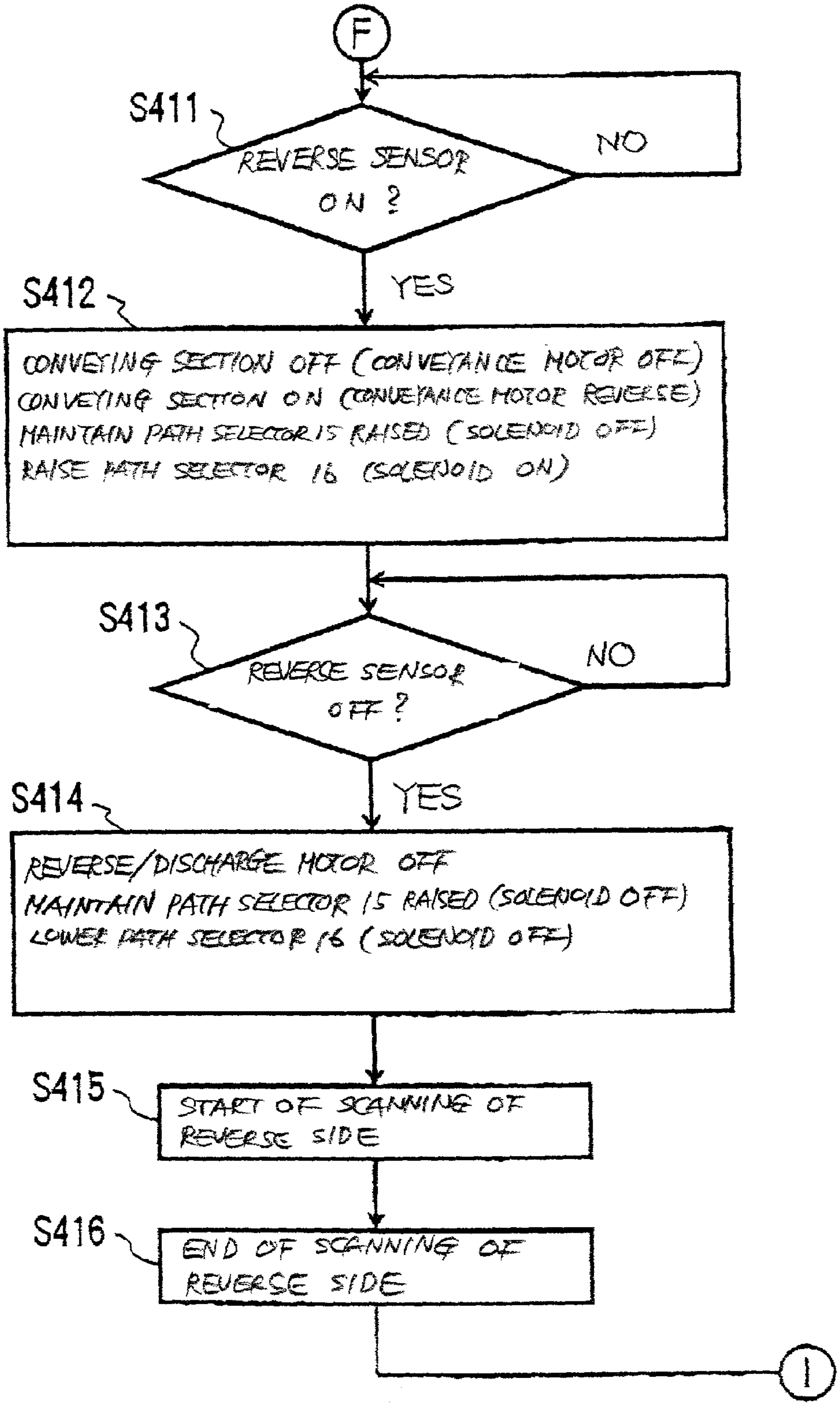
FIG. 17 is a flowchart showing another part of a specific operation of the illustrative embodiment in the both-side mode.
Figure 18:
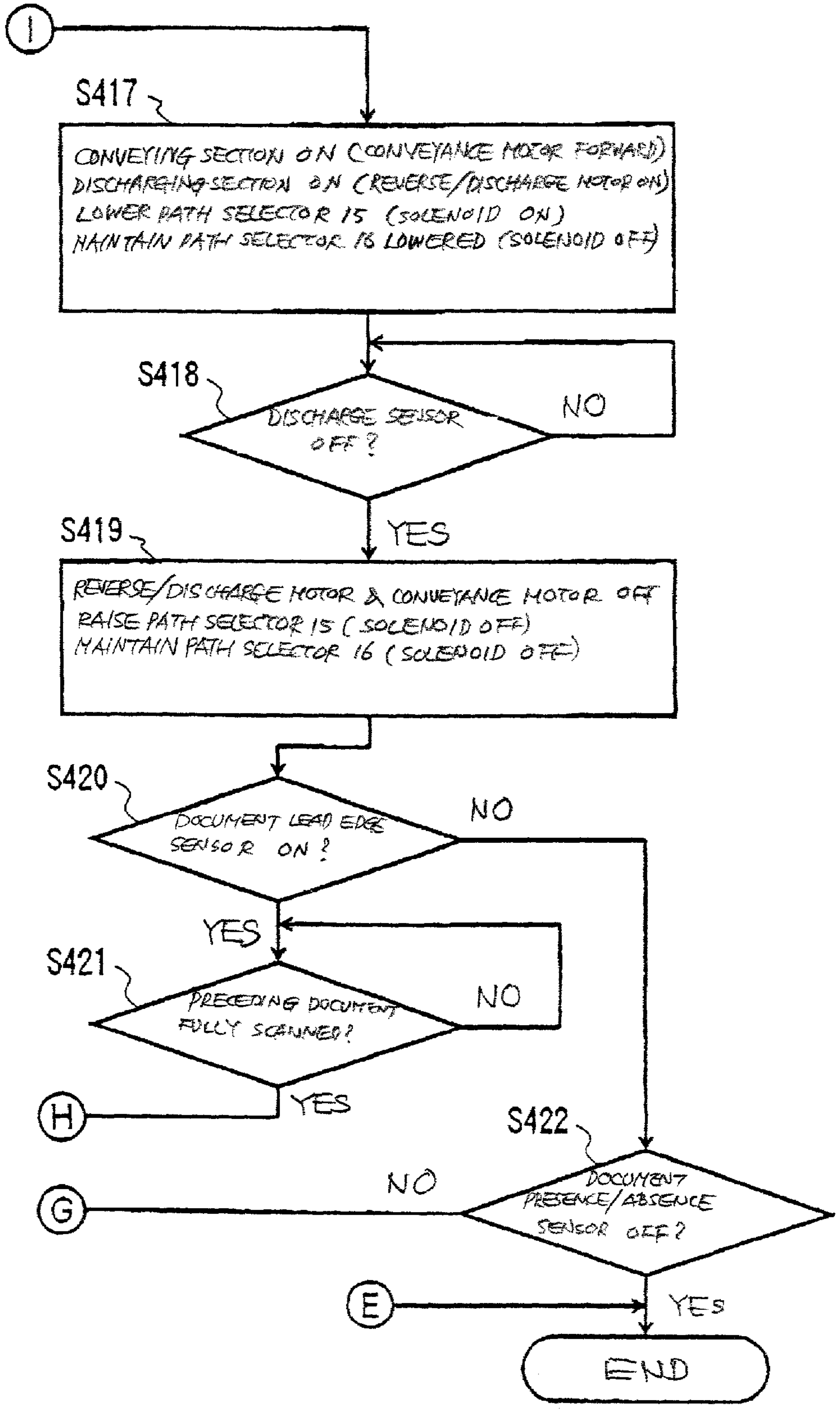
FIG. 18 is a flowchart showing still another part of a specific operation of the illustrative embodiment in the both-side mode.
Figure 19:
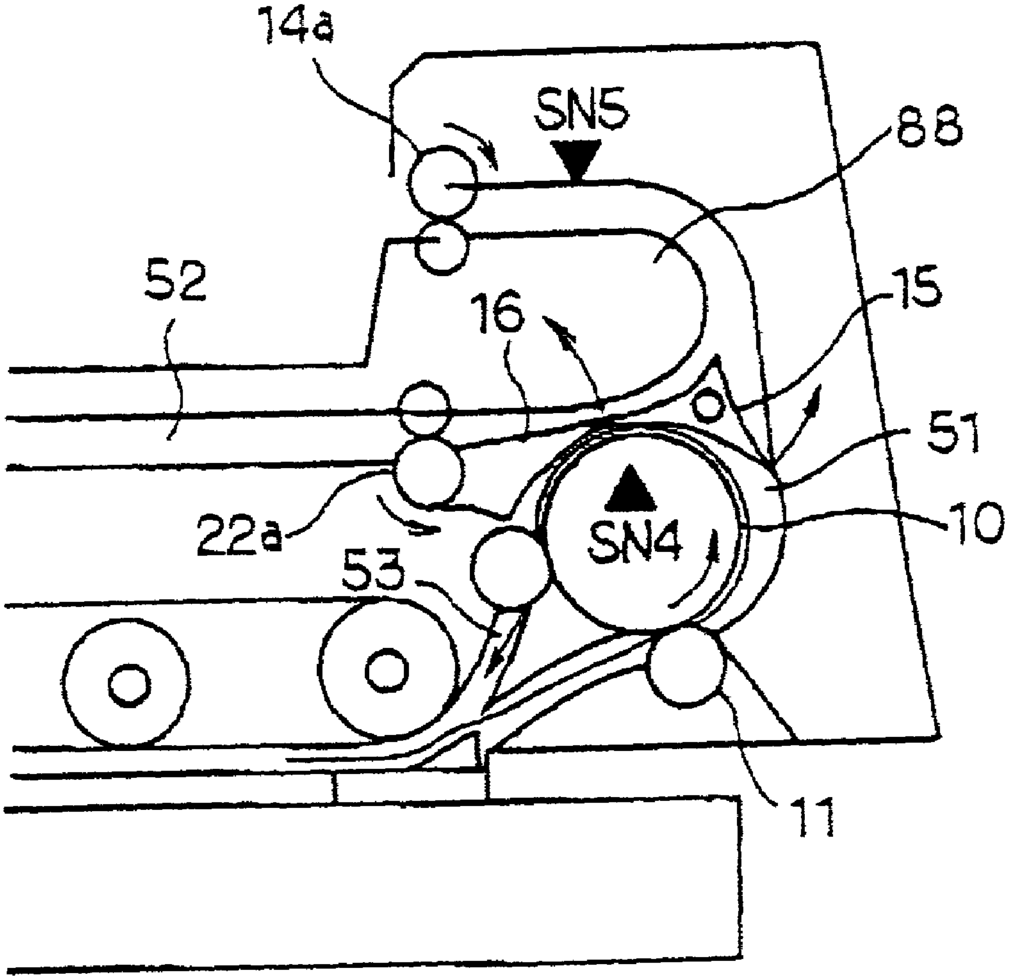
FIG. 19 is a section showing the movement of the path selectors in the both-side mode.

Referring to FIGS. 16 through 18, the operation of the illustrative embodiment in the duplex copy mode will be described. The operator stacks the documents S on the feed tray 1 with the front sides facing upward and then presses the copy start button in the same manner as in the simplex copy mode. In response, the top document S is fed from the feed tray 1 to the conveying section via the first path 50 and then stopped at the scanning position on the glass platen 9. After the front side of the document S has been scanned, the conveyance motor 31 rotates in the forward direction and causes the belt 8 to convey the document S to the discharging section. At this stage of operation, the path selector 15 is held at the home position while the path selector 16 is held in the lowered position, as shown in FIG. 19.

As soon as the conveyance motor 31 starts rotating in the forward direction, the reverse discharge motor starts rotating in the forward direction and causes the discharge drive roller 10 to convey the document D to the reversing/discharging section. At this instant, the path selectors 15 and 16 guide the document D. When the reversal sensor SN4 senses the leading edge of the document S, the conveyance motor 31 rotates in the reverse direction so as to reverse the document S via the second path 53 and return it to the conveying section.

The above document S is again stopped at the scanning position on the glass platen 9 and has its reverse side scanned. Subsequently, the conveyance motor 31 rotates in the forward direction and causes the belt 8 to again convey the document S to the discharging section. The reverse/discharge motor rotates in the forward direction at the same time as the conveyance motor 31 rotates in the same direction. At this instant, the path selector is lowered to the position shown in FIG. 8 for guiding the document S to the path 51 instead the switchback path 52. The document S is then driven out to the receipt tray 3 via the discharge sensor SN5, FIG. 8, and outlet rollers 14 with the front side thereof facing downward. This is also successful to stack the documents S on the receipt tray 3 in order of page.

In the duplex copy mode, too, the next document S paid out waits until the preceding document S to the discharging section. The next document S is then conveyed to the conveying section via the first path 50 and stopped on the glass platen 9 to be scanned.

As stated above, the illustrative embodiment discharges the documents S in order of page in the one-side mode or increases the conveying speed in the both-side mode by omitting switchback. By uncovering the shared path including the path 51, it is possible to easily remove the document S jamming the discharging section. Further, the one-side mode and both-side mode share a single receipt tray 3 and therefore simplifies the construction while saving space.

The paths 52 and 51 for routing the document S to the receipt tray 3 after switching it back are arranged between the scanning position and the tray 3. This obviates the need for a horizontal tray for thereby further saving space.

Assume that the operator forgets to remove the document S on the glass platen 9. Then, as soon as the first document S begins to be conveyed from the feeding section to the first path 50, the document S left on the glass platen 9 is conveyed away from the scanning position and then driven out to the receipt tray 3 with its front side facing upward, bypassing the switchback path 52. Such a position of the document S on the receipt tray 3 allows a person to see whether or not the document S is a document inadvertently left on the glass platen 9.

The discharge drive roller 10 selectively conveys the document S to the switchback rollers 22, the discharge rollers 14 or the scanning position alone. This reduces the number of reverse/discharge rollers and therefore the total number of parts, contributing a great deal to cost reduction. In addition, the distance over which the document S should be conveyed in the reversing/discharging is reduced, so that rapid conveyance is promoted.

Moreover, in the event of a jam or the removal of a jamming document D, the discharge drive roller 10 stops rotating and allows the document D to be easily pulled out.

Second Embodiment

An alternative embodiment of the present invention will be described hereinafter. This embodiment is generally identical with the previous embodiment except for the configuration of the first discharge drive roller 10. In the figures, identical reference numerals designate identical structural elements. The following description will concentrate on the difference between this embodiment and the previous embodiment.

In the illustrative embodiment, an electromagnetic clutch is substituted for the gear Z5 of the discharge drive roller 10. When the document S jams the path with its trailing edge left in the conveying section, the electromagnetic clutch allows it to be easily pulled out.

In operation, when the discharge motor 32 (M), FIG. 14, is in rotation, the ADF controller 29 couples the electromagnetic clutch substituted for the gear Z5. As a result, the rotation of the discharge motor 32 is transferred to the discharge drive roller 10. While the discharge motor 32 is out of rotation, the ADF controller 29 uncouples the above clutch for thereby interrupting the drive transmission to the discharge drive roller 10. More specifically, the discharge drive roller 10 rotates only counterclockwise (arrow) while the motor 32 is in rotation, but can rotate in both directions while the motor 32 is out of rotation.

As shown in FIG. 3, assume that the document S jams the path with its leading edge nipped between the discharge drive roller 10 and discharge driven roller 11 and with its trailing edge left in the conveying section. Then, the ADF controller 29 turns off the discharge motor 32 and uncouples the electromagnetic clutch, thereby interrupting drive transmission. In this condition, when the operator draws the trailing edge of the document S, the document S can be easily pulled out without any damage while causing the discharge drive roller 10 to rotate clockwise.

Third Embodiment

Another alternative embodiment will be described with reference to FIGS. 20 through 24. This embodiment is similar to the first embodiment except that the first path selector 15 is mounted on the openable outlet cover 23, in that part of the receipt tray 3 is angularly movable about a fulcrum 3*c*, and that the entire receipt tray 3 is angularly movable about a fulcrum 3*d*. This configuration allows the document S jamming the conveying section or the discharging section to be easily removed.

Figure 20:
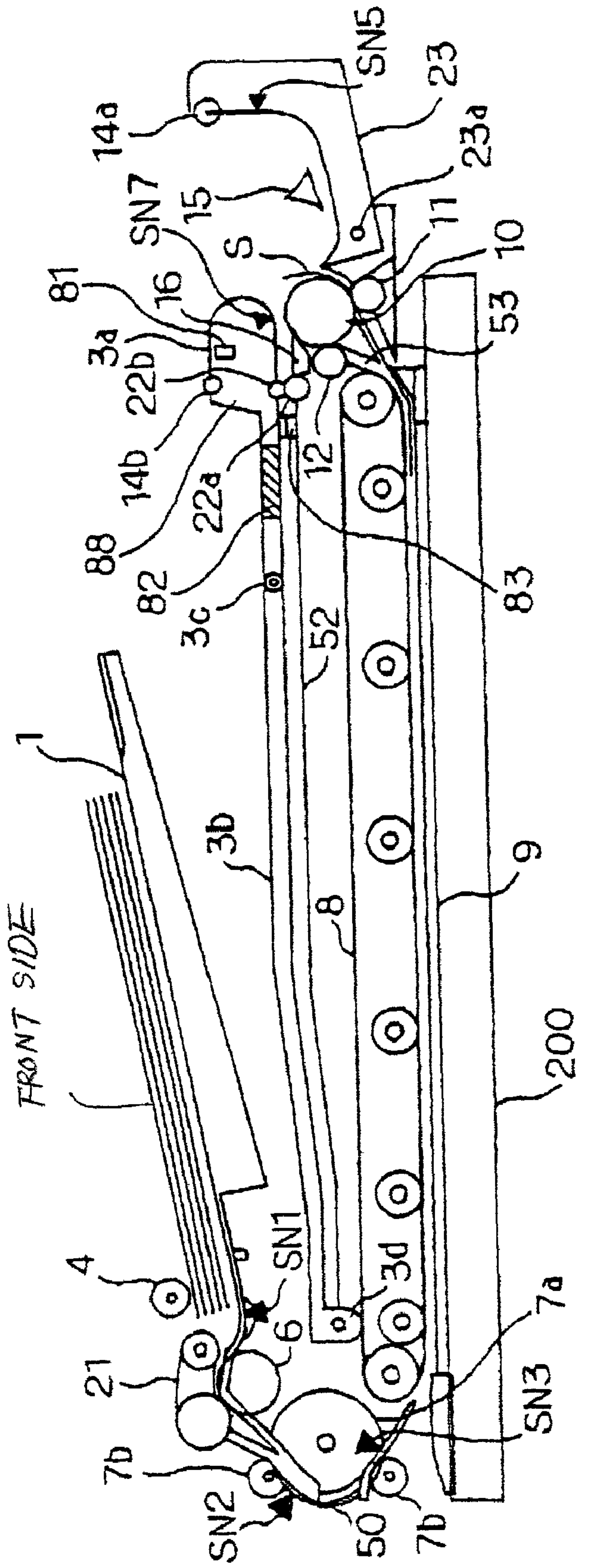
FIG. 20 is a section showing a third embodiment of the present invention in a condition in which an outlet cover is opened.

Specifically, the outlet cover 23 with the first path selector 15 can be opened to the position shown in FIG. 20. The outlet cover 23 plays the role of a sheet guide facing the first discharge drive roller 10 when closed. The outlet cover 23 therefore uncovers the path around the discharge drive roller 10 when opened. For example, assume that the document S jams the path with its leading edge nipped between the discharge drive roller 10 and the discharge driven roller 11 and with its trailing edge left in the conveying section. Then, the operator can open the outlet cover 23 and then easily pull out the document S by nipping its leading edge.

Figure 21:
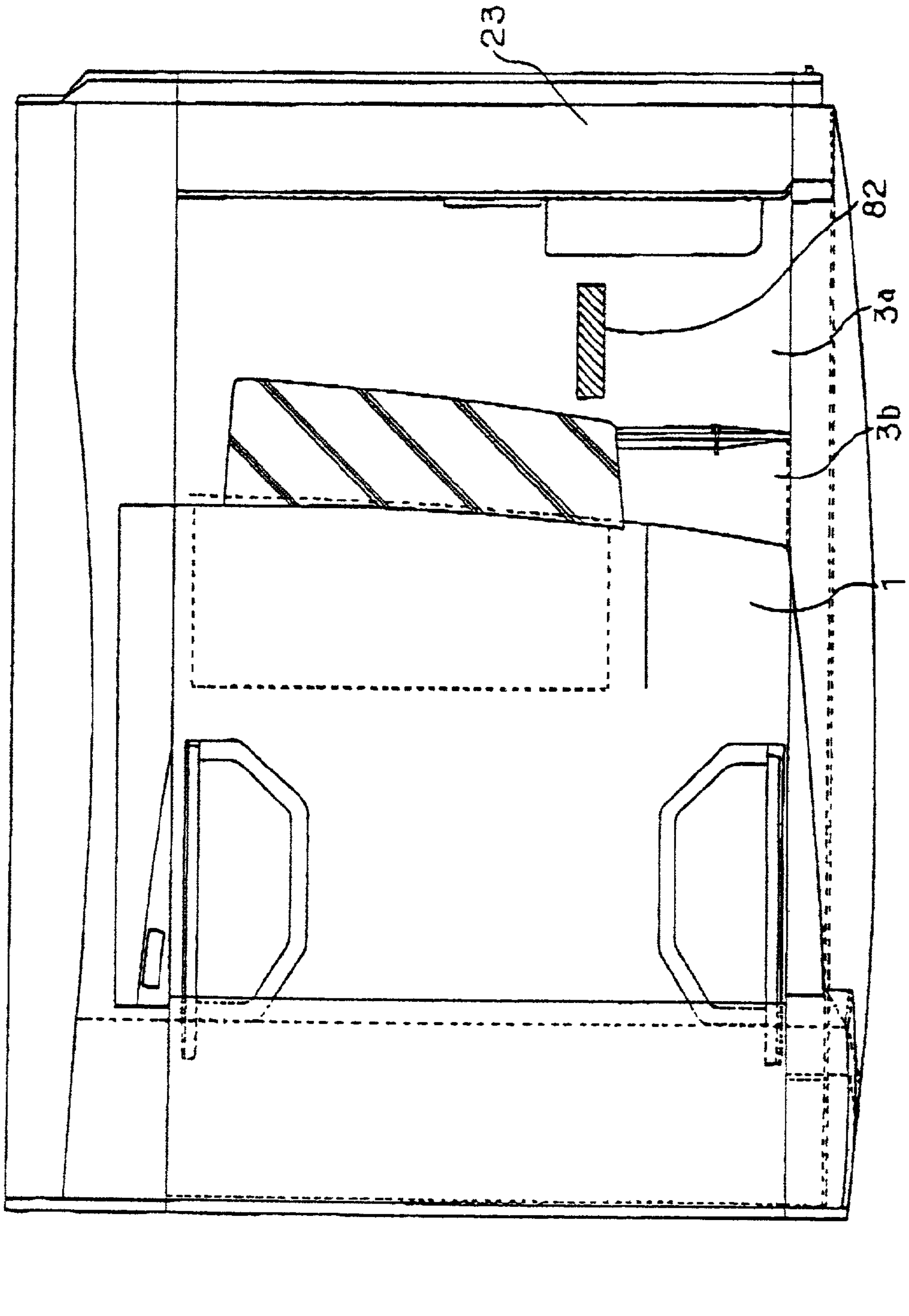
FIG. 21 is a plan view showing the third embodiment.

As shown in FIG. 21, a slot 82 is formed in part 3*a* of the receipt tray 3 adjoining the outlet of the discharging section and is covered with a transparent member. The operator can see the path 52 through the slot 82. When the document D entered the path 52 is pressed to deform in the form of bellows and jams the path 52, the operator can remove the document S by seeing it through the slot 82.

Figure 22B:
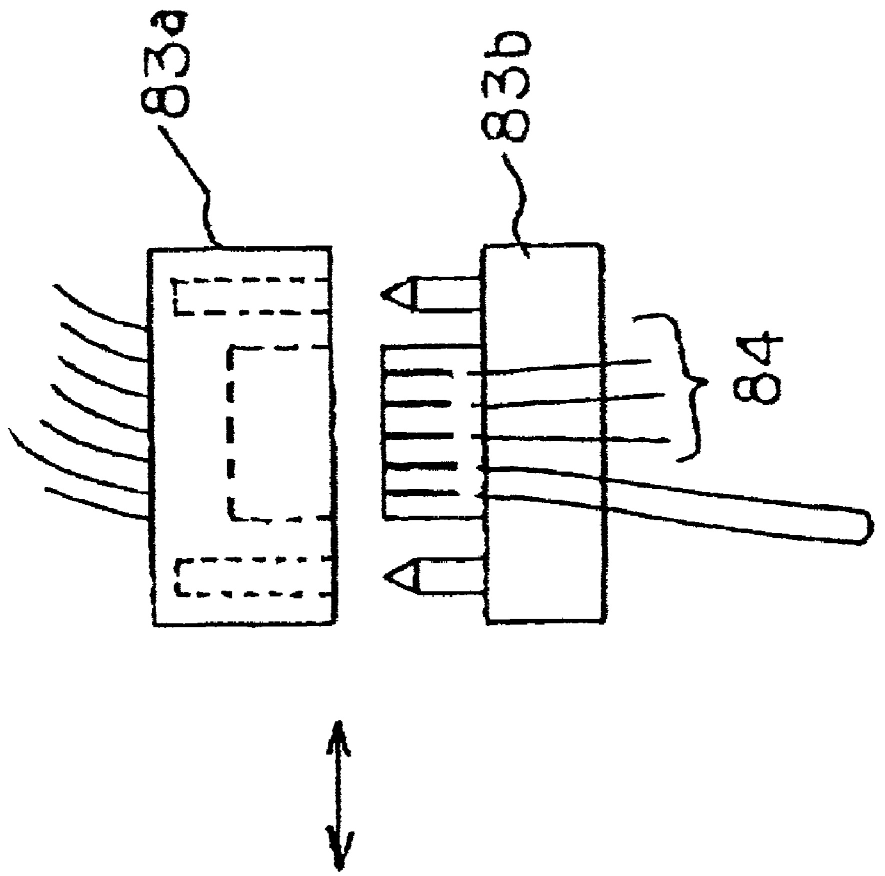
FIGS. 22A and 22B show the configuration of a switch included in the third embodiment.
Figure 22A:
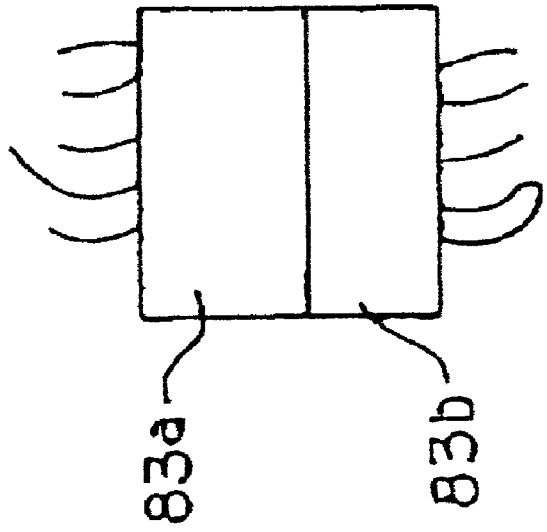

As shown in FIG. 20, the illustrative embodiment additionally includes a switch 83 responsive to the opening and closing of the receipt tray 3. As shown in FIGS. 22A and 22B, the switch 83 is made up of connector portions 83*a* and 83*b* mounted on the tray 3 and ADF body, respectively. The switch 83 turns off (disconnected state shown in FIG. 22B) when the receipt tray 3 is opened or turns on (connected state shown in FIG. 22A) when it is closed. The connector portion 83*b* includes signal lines 84 extending from the stamper solenoid 85 and a reversal sensor SN7 and has its input side and outside short-circuited. The connector portion 83*a* includes signal lines for input and output. In this configuration, when the receipt tray 3 is closed, the switch 83 turns on for thereby delivering current to the stamper solenoid 85 and reversal sensor SN7.

The reversal sensor SN7 corresponds to the reversal sensor SN4 of the first embodiment. In the illustrative embodiment, the reversal sensor SN7 is mounted on the outlet guide 88 with its optical axis facing downward, so that paper dust produced from the documents S does not deposit on the reversal sensor SN7.

Figure 23:
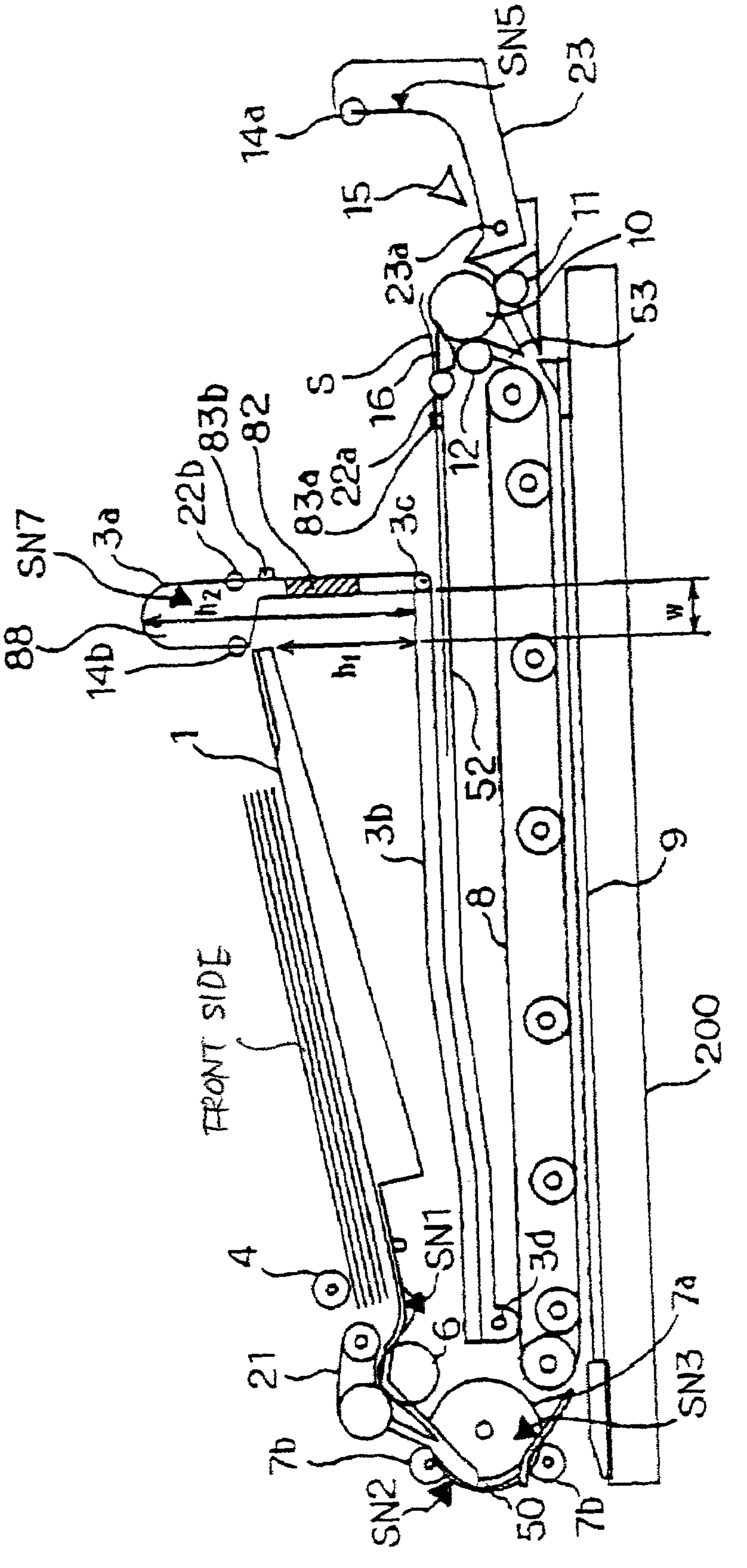
FIG. 23 is a section showing the third embodiment in a condition in which the outlet cover and part of a receipt tray are opened.

The part 3*a* of the receipt tray 3 can be opened about the fulcrum 3*c* to the position shown in FIG. 23. The part 3*a* serves, in the closed position, as an inner guide for the document S switched back and reversed thereby. The second discharge driven roller 14*b* and switchback driven roller 22*b* are mounted on the part 3*a* of the receipt tray 3. Assume that the document S jams the switchback path 52 while remaining on the switchback roller 22*a*. Then, the operator can open the outlet cover 23 and then the part 3*a* of the receipt tray 3 in order to remove the jamming sheet.

Figure 24:
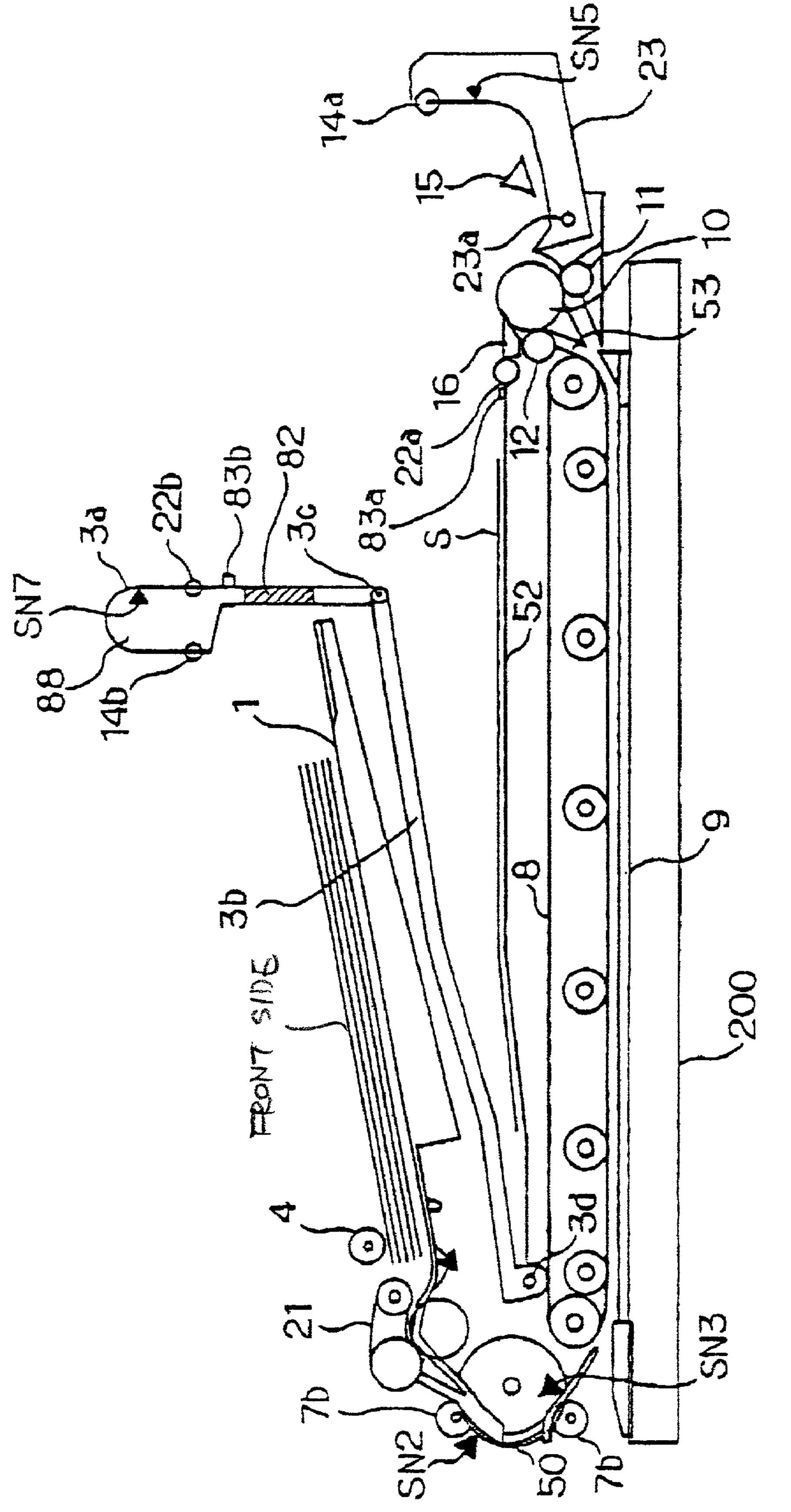
FIG. 24 is a section showing the third embodiment in which the outlet cover and two parts of a receipt tray are opened.

Further, the other part 3*b* of the receipt tray 3 adjoining the feeding section can be opened about the fulcrum 3*d* to the position shown in FIG. 24. Assume that the operator inadvertently inserts the document S into the switchback path 52. Then, the operator can open the outlet cover 23, open the part 3*a* of the receipt tray 3 and then open the entire receipt tray 3 in order to remove the document S from the switchback path 52.

The fulcrum 3*c* is so positioned as to facilitate the angular movement of the parts 3*a* and 3*b* of the receipt tray 3. Specifically, assume that the height from the top of the part 3*b* to the edge of the feed tray 1 is $h_1$, and that the height from the top of the part 3*b* to the top of the part 3*a* when the part 3*a* is fully opened is $h_2$. Then, the fulcrum 3*c* is positioned such that the height $h_1$ is smaller than the height $h^2$, and that the top of the part 3*a* does not contact the feed tray 1 when fully opened. In FIG. 23, w indicates substantially the maximum width of the part 3*a*.

The illustrative embodiment has the following advantage in addition to the various advantages described above. The second discharge drive roller 14*a* for driving the document S to the receipt tray 3 is positioned is mounted on an outer guide, which delimits the paths 51 and 52. The discharge drive roller 14*a* therefore contacts the reverse side of the document S. It follows that when, e.g., a document written by hand with a pencil is conveyed, the rubber surface of the discharge drive roller 14*a* is prevented from being smeared by carbon particles; otherwise, the carbon particles would be transferred from the roller 14*a* to the other documents to follow.

The slot 82, reversal sensor SN7 and switch 83 may be applied to the first and second embodiments, if desired.

In the embodiments shown and described, the pickup roller 4 and belt 21 constitute feeding means. The pullout rollers 21 arranged on the first path 50 constitute first conveying means. The first discharge drive roller 10 and reverse discharge roller 12 on the second path 53 constitute second conveying means. The switchback rollers 22 on the switchback path 52 constitute switchback conveying means. The outlet guide 88 constitutes guide means. The second discharge rollers 14 on the path 51 constitute third conveying means. The first and second path selectors 15 and 16 constitute steering means. The outlet cover 23 constitutes covering means. The ADF controller 29 constitutes control means. The stamper 81 constitutes stamping means. The discharge sensor SN7 constitutes switchback sensing means. The parts 3*a* and 3*b* of the receipt tray 3 constitutes the front part and rear part of the tray 3, respectively. The fulcrums 3*c* and 3*d* constitute connecting portions. The deformation sensor SN6 constitutes jam sensing means. The switch 83 constitutes connecting/disconnecting means. The electromagnetic clutch and one-way clutches constitute drive transmission regulating means.

In summary, it will be seen that the present invention provides an ADF and an image forming apparatus having various unprecedented advantages, as enumerated below.

(1) A document conveyed away from a scanning position is driven out to a receipt tray via a switchback path or by bypassing it. Therefore, documents can be discharged in order of page in a one-side mode or can be rapidly conveyed in a both-side mode by bypassing the switchback path. A shared path can be uncovered and therefore allows a document jamming a discharging section to be easily removed. A single drive roller and guide means convey each document to a single receipt tray via an outlet, so that the construction is simple and space saving.

(2) Two path selectors select any one of three paths for conveyance. Particularly, when the comb-like edges of the path selectors intersect each other, it is possible to lower the leading edge of a document scanned in the both-side mode and convey it to a reversal path.

(3) A drive roller included in third conveying means contacts the reverse side of a document and is therefore protected from smearing ascribable to, e.g., a document written by hand with a pencil.

(4) Covering means delimits, when closed, the shared path and sets up conveyance pressure or nip pressure between roller pairs positioned in the discharging section.

(5) Stamping means is mounted on the receipt tray and therefore does not protrude to the outside of the ADF. This also saves space.

(6) Switchback sensing means is mounted on the receipt tray for sensing a document on the switchback path. The switchback sensing means has an optical axis directed downward. Therefore, dust including paper dust is prevented from depositing on the switchback sensing means and causing errors to occur.

(7) The front part and rear part of the receipt tray each are openable about a respective connecting portion. The receipt tray can therefore be partly or entirely opened in accordance with a jam position. This provides a broad space available for the removal of a document jamming the switchback section and thereby facilitates jam processing. In addition, because only necessary part of the receipt tray is opened, impurities including dust are prevented from entering the ADF.

(8) A slot or window is formed in the front part of the receipt tray, so that the operator can see a document jamming the switchback path and remove it.

(9) Jam sensing means is mounted on the front part of the receipt tray for sensing a document jamming the switchback path. The sensing means can therefore surely detect a jam on the switchback path even when the operator does not stand by the ADF.

(10) Connecting/disconnecting means selectively sets up or interrupts power supply to the stamping means when the receipt tray is closed or opened, respectively. This obviates the need of an exclusive sensor and therefore simplifies the construction.

(11) Assume that a document is switched back by switchback conveying means and then driven out to the receipt tray. Then, when a feed motor is switched in the direction of rotation, a drive roller for switchback is also switched. However, drive rollers included in the second and third conveying means always rotate only in a direction in which a document is conveyed from the scanning position to the receipt tray. It is therefore possible to reduce the interval between documents for thereby further promoting rapid conveyance.

(12) The image forming apparatus with the above ADF achieves high conveying speed, facilitates the removal of a jamming document, and has simple, space saving configuration.

Various modifications will become possible for those skilled in the art after receiving the teachings of the present disclosure without departing from the scope thereof.

What is claimed is:

1. An ADF (Automatic Document Feeder) comprising:

a feed tray configured to allow documents to be stacked thereon with front sides facing upward;

a receipt tray positioned below said feed tray, but above a scanning position, and configured to allow each document having one side or both sides scanned at said scanning position to be driven out to said receipt tray, said receipt tray being angularly movable such that an outlet side thereof opens;

feeding means for sequentially feeding a top document to a bottom document stacked on said feed tray one by one while separating each document from underlying documents;

first conveying means for reversing the document fed by said feeding means and conveying said document to the scanning position;

second conveying means for conveying the document from the scanning position to a shared path available for both of a one-side scanning mode and a both-side scanning mode, reversing said document, and again conveying said document to said scanning position;

switchback conveying means for conveying the document reversed by said second conveying means via said shared path to a switchback path below said receipt tray;

guide means constructed integrally with said receipt tray for reversing the document driven out of said switchback path by said switchback conveying means in the reverse direction toward an outlet via said shared path;

third conveying means for conveying the document conveyed from the scanning position toward said outlet via said shared path to said receipt tray;

switching means for steering the document toward one of said shared path, said switchback path and a reversal path along which the document reversed after scanning is again brought to the scanning position;

covering means for covering part of said second conveying means, said guide means and said switching means to thereby delimit said shared path, said covering means being angularly movable for uncovering said shared path; and control means for causing said switching means to steer, in the both-side scanning mode, said document whose both sides have been scanned toward said shared path or to steer, in the one-side scanning mode, said document whose one side has been scanned toward said switchback path.

2. The ADF as claimed in claim 1, wherein said switching means comprises:

a first path selector mounted on said covering means, positioned on said shared path, and having a comb-like edge; and a second path selector adjoining said second conveying means and said switchback conveying means, extending from said reversal path to said switchback path, and having a comb-like edge;

wherein when the document reversed after scanning is again conveyed to the scanning position, said comb-like edge of said first path selector and said comb-like edge of said second path selector intersect each other.

3. The ADF as claimed in claim 2, wherein said covering means further comprises a drive roller of a roller pair that constitutes said third conveying means.

4. The ADF as claimed in claim 3, wherein said guide means comprises:

a driven roller of said roller pair constantly biased toward said drive roller; and a driven roller of a roller pair, which constitutes said switchback conveying means, constantly biased toward a drive roller of said roller pair;

wherein when said covering means is closed, nip pressure is set up between rollers constituting said third conveying means and between rollers constituting said switchback conveying means.

5. The ADF as claimed in claim 4, wherein said guide means further comprises stamping means for stamping "copied " on the document scanned and passing through said shared path.

6. The ADF as claimed in claim 5, wherein said guide means further comprises switchback sensing means for sensing the document on said switchback path.

7. The ADF as claimed in claim 6, wherein said receipt tray comprises:

a front part including said guide means;

a rear part; and connecting portions each for angularly movably supporting one of said front part and said rear part.

8. The ADF as claimed in claim 7, further comprising a slot formed in said front part of said receipt tray, so that said switchback path is visible through said slot.

9. The ADF as claimed in claim 8, further comprising jam sensing means mounted on said front part of said receipt tray for sensing the document jamming said switchback path.

10. The ADF as claimed in claim 9, further comprising connecting/disconnecting means for selectively connecting or disconnection power supply to said stamping means in interlocked relation to closing or opening, respectively, of said receipt tray.

11. The ADF as claimed in claim 10, further comprising:

a discharge motor for driving a drive roller constituting said second conveying means, said drive roller of said switchback path and said drive roller of said third conveying means; and first drive transmission regulating means for regulating drive transmission from said discharge motor;

wherein when said switchback conveying means switches back the document conveyed from the scanning position and again reverses said document for thereby conveying said document to said receipt tray, said control means switches a direction of rotation of said discharge motor and causes said drive transmission regulation means to switch a direction of rotation of only said drive roller of said switchback conveying means.

12. The ADF as claimed in claim 11, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

13. The ADF as claimed in claim 1, wherein said covering means further comprises a drive roller of a roller pair that constitutes said third conveying means.

14. The ADF as claimed in claim 13, wherein said guide means comprises:

a driven roller of said roller pair constantly biased toward said drive roller; and a driven roller of a roller pair, which constitutes said switchback conveying means, constantly biased toward a drive roller of said roller pair;

wherein when said covering means is closed, nip pressure is set up between rollers constituting said third conveying means and between rollers constituting said switchback conveying means.

15. The ADF as claimed in claim 14, wherein said guide means further comprises stamping means for stamping "copied" on the document scanned and passing through said shared path.

16. The ADF as claimed in claim 15, wherein said guide means further comprises switchback sensing means for sensing the document on said switchback path.

17. The ADF as claimed in claim 16, wherein said receipt tray comprises:

a front part including said guide means;

a rear part; and connecting portions each for angularly movably supporting one of said front part and said rear part.

18. The ADF as claimed in claim 17, further comprising a slot formed in said front part of said receipt tray, so that said switchback path is visible through said slot.

19. The ADF as claimed in claim 18, further comprising jam sensing means mounted on said front part of said receipt tray for sensing the document jamming said switchback path.

20. The ADF as claimed in claim 19, further comprising connecting/disconnecting means for selectively connecting or disconnection power supply to said stamping means in interlocked relation to closing or opening, respectively, of said receipt tray.

21. The ADF as claimed in claim 20, further comprising:

a discharge motor for driving a drive roller constituting said second conveying means, said drive roller of said switchback path and said drive roller of said third conveying means; and first drive transmission regulating means for regulating drive transmission from said discharge motor;

wherein when said switchback conveying means switches back the document conveyed from the scanning position and again reverses said document for thereby conveying said document to said receipt tray, said control means switches a direction of rotation of said discharge motor and causes said drive transmission regulation means to switch a direction of rotation of only said drive roller of said switchback conveying means.

22. The ADF as claimed in claim 21, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

23. The ADF as claimed in claim 1, wherein said guide means further comprises stamping means for stamping "copied" on the document scanned and passing through said shared path.

24. The ADF as claimed in claim 23, wherein said guide means further comprises switchback sensing means for sensing the document on said switchback path.

25. The ADF as claimed in claim 24, wherein said receipt tray comprises:

a front part including said guide means;

a rear part; and connecting portions each for angularly movably supporting one of said front part and said rear part.

26. The ADF as claimed in claim 25, further comprising a slot formed in said front part of said receipt tray, so that said switchback path is visible through said slot.

27. The ADF as claimed in claim 26, further comprising jam sensing means mounted on said front part of said receipt tray for sensing the document jamming said switchback path.

28. The ADF as claimed in claim 27, further comprising connecting/disconnecting means for selectively connecting or disconnection power supply to said stamping means in interlocked relation to closing or opening, respectively, of said receipt tray.

29. The ADF as claimed in claim 28, further comprising:

a discharge motor for driving a drive roller constituting said second conveying means, said drive roller of said switchback path and said drive roller of said third conveying means; and first drive transmission regulating means for regulating drive transmission from said discharge motor;

wherein when said switchback conveying means switches back the document conveyed from the scanning position and again reverses said document for thereby conveying said document to said receipt tray, said control means switches a direction of rotation of said discharge motor and causes said drive transmission regulating means to switch a direction of rotation of only said drive roller of said switchback conveying means.

30. The ADF as claimed in claim 29, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

31. The ADF as claimed in claim 1, wherein said guide means further comprises switchback sensing means for sensing the document on said switchback path.

32. The ADF as claimed in claim 31, wherein said receipt tray comprises:

a front part including said guide means;

a rear part; and connecting portions each for angularly movably supporting one of said front part and said rear part.

33. The ADF as claimed in claim 32, further comprising a slot formed in said front part of said receipt tray, so that said switchback path is visible through said slot.

34. The ADF as claimed in claim 33, further comprising jam sensing means mounted on said front part of said receipt tray for sensing the document jamming said switchback path.

35. The ADF as claimed in claim 34, further comprising connecting/disconnecting means for selectively connecting or disconnection power supply to said stamping means in interlocked relation to closing or opening, respectively, of said receipt tray.

36. The ADF as claimed in claim 35, further comprising:

a discharge motor for driving a drive roller constituting said second conveying means, said drive roller of said switchback path and said drive roller of said third conveying means; and first drive transmission regulating means for regulating drive transmission from said discharge motor;

wherein when said switchback conveying means switches back the document conveyed from the scanning position and again reverses said document for thereby conveying said document to said receipt tray, said control means switches a direction of rotation of said discharge motor and causes said drive transmission regulation means to switch a direction of rotation of only said drive roller of said switchback conveying means.

37. The ADF as claimed in claim 36, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

38. The ADF as claimed in claim 1, wherein said receipt tray comprises:

a front part including said guide means;

a rear part; and connecting portions each for angularly movably supporting one of said front part and said rear part.

39. The ADF as claimed in claim 38, further comprising a slot formed in said front part of said receipt tray, so that said switchback path is visible through said slot.

40. The ADF as claimed in claim 39, further comprising jam sensing means mounted on said front part of said receipt tray for sensing the document jamming said switchback path.

41. The ADF as claimed in claim 40, further comprising connecting/disconnecting means for selectively connecting or disconnection power supply to said stamping means in interlocked relation to closing or opening, respectively, of said receipt tray.

42. The ADF as claimed in claim 41, further comprising:

a discharge motor for driving a drive roller constituting said second conveying means, said drive roller of said switchback path and said drive roller of said third conveying means; and first drive transmission regulating means for regulating drive transmission from said discharge motor;

wherein when said switchback conveying means switches back the document conveyed from the scanning position and again reverses said document for thereby conveying said document to said receipt tray, said control means switches a direction of rotation of said discharge motor and causes said drive transmission regulation means to switch a direction of rotation of only said drive roller of said switchback conveying means.

43. The ADF as claimed in claim 42, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

44. The ADF as claimed in claim 1, further comprising a slot formed in said front part of said receipt tray, so that said switchback path is visible through said slot.

45. The ADF as claimed in claim 44, further comprising jam sensing means mounted on said front part of said receipt tray for sensing the document jamming said switchback path.

46. The ADF as claimed in claim 45, further comprising connecting/disconnecting means for selectively connecting or disconnection power supply to said stamping means in interlocked relation to closing or opening, respectively, of said receipt tray.

47. The ADF as claimed in claim 46, further comprising:

a discharge motor for driving a drive roller constituting said second conveying means, said drive roller of said switchback path and said drive roller of said third conveying means; and first drive transmission regulating means for regulating drive transmission from said discharge motor;

wherein when said switchback conveying means switches back the document conveyed from the scanning position and again reverses said document for thereby conveying said document to said receipt tray, said control means switches a direction of rotation of said discharge motor and causes said drive transmission regulation means to switch a direction of rotation of only said drive roller of said switchback conveying means.

48. The ADF as claimed in claim 47, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

49. The ADF as claimed in claim 1, further comprising jam sensing means mounted on said front part of said receipt tray for sensing the document jamming said switchback path.

50. The ADF as claimed in claim 49, further comprising connecting/disconnecting means for selectively connecting or disconnection power supply to said stamping means in interlocked relation to closing or opening, respectively, of said receipt tray.

51. The ADF as claimed in claim 50, further comprising:

a discharge motor for driving a drive roller constituting said second conveying means, said drive roller of said switchback path and said drive roller of said third conveying means; and first drive transmission regulating means for regulating drive transmission from said discharge motor;

wherein when said switchback conveying means switches back the document conveyed from the scanning position and again reverses said document for thereby conveying said document to said receipt tray, said control means switches a direction of rotation of said discharge motor and causes said drive transmission regulation means to switch a direction of rotation of only said drive roller of said switchback conveying means.

52. The ADF as claimed in claim 51, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

53. The ADF as claimed in claim 1, further comprising connecting/disconnecting means for selectively connecting or disconnection power supply to said stamping means in interlocked relation to closing or opening, respectively, of said receipt tray.

54. The ADF as claimed in claim 53, further comprising:

a discharge motor for driving a drive roller constituting said second conveying means, said drive roller of said switchback path and said drive roller of said third conveying means; and first drive transmission regulating means for regulating drive transmission from said discharge motor;

wherein when said switchback conveying means switches back the document conveyed from the scanning position and again reverses said document for thereby conveying said document to said receipt tray, said control means switches a direction of rotation of said discharge motor and causes said drive transmission regulation means to switch a direction of rotation of only said drive roller of said switchback conveying means.

55. The ADF as claimed in claim 54, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

56. The ADF as claimed in claim 1, further comprising:

a discharge motor for driving a drive roller constituting said second conveying means, said drive roller of said switchback path and said drive roller of said third conveying means; and first drive transmission regulating means for regulating drive transmission from said discharge motor;

wherein when said switchback conveying means switches back the document conveyed from the scanning position and again reverses said document for thereby conveying said document to said receipt tray, said control means switches a direction of rotation of said discharge motor and causes said drive transmission regulation means to switch a direction of rotation of only said drive roller of said switchback conveying means.

57. The ADF as claimed in claim 56, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

58. The ADF as claimed in claim 1, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

59. In an image forming apparatus including an ADF, said ADF comprising:

a feed tray configured to allow documents to be stacked thereon with front sides facing upward;

a receipt tray positioned below said feed tray, but above a scanning position, and configured to allow each document having one side or both sides scanned at said scanning position to be driven out to said receipt tray, said receipt tray being angularly movable such that an outlet side thereof opens;

feeding means for sequentially feeding a top document to a bottom document stacked on said feed tray one by one while separating each document from underlying documents;

first conveying means for reversing the document fed by said feeding means and conveying said document to the scanning position;

second conveying means for conveying the document from the scanning position to a shared path available for both of a one-side scanning mode and a both-side scanning mode, reversing said document, and again conveying said document to said scanning position;

switchback conveying means for conveying the document reversed by said second conveying means via said shared path to a switchback path below said receipt tray;

guide means constructed integrally with said receipt tray for reversing the document driven out of said switchback path by said switchback conveying means in the reverse direction toward an outlet via said shared path;

third conveying means for conveying the document conveyed from the scanning position toward said outlet via said shared path to said receipt tray;

switching means for steering the document toward one of said shared path, said switchback path and a reversal path along which the document reversed after scanning is again brought to the scanning position;

covering means for covering part of said second conveying means, said guide means and said switching means to thereby delimit said shared path, said covering means being angularly movable for uncovering said shared path; and control means for causing said switching means to steer, in the both-side scanning mode, said document whose both sides have been scanned toward said shared path or to steer, in the one-side scanning mode, said document whose one side has been scanned toward said switchback path.

60. The ADF as claimed in claim 59, wherein said switching means comprises:

a first path selector mounted on said covering means, positioned on said shared path, and having a comb-like edge; and a second path selector adjoining said second conveying means and said switchback conveying means, extending from said reversal path to said switchback path, and having a comb-like edge;

wherein when the document reversed after scanning is again conveyed to the scanning position, said comb-like edge of said first path selector and said comb-like edge of said second path selector intersect each other.

61. The ADF as claimed in claim 60, wherein said covering means further comprises a drive roller of a roller pair that constitutes said third conveying means.

62. The ADF as claimed in claim 61, wherein said guide means comprises:

a driven roller of said roller pair constantly biased toward said drive roller; and a driven roller of a roller pair, which constitutes said switchback conveying means, constantly biased toward a drive roller of said roller pair;

wherein when said covering means is closed, nip pressure is set up between rollers constituting said third conveying means and between rollers constituting said switchback conveying means.

63. The ADF as claimed in claim 62, wherein said guide means further comprises stamping means for stamping "copied" on the document scanned and passing through said shared path.

64. The ADF as claimed in claim 63, wherein said guide means further comprises switchback sensing means for sensing the document on said switchback path.

65. The ADF as claimed in claim 64, wherein said receipt tray comprises:

a front part including said guide means;

a rear part; and connecting portions each for angularly movably supporting one of said front part and said rear part.

66. The ADF as claimed in claim 65, further comprising a slot formed in said front part of said receipt tray, so that said switchback path is visible through said slot.

67. The ADF as claimed in claim 66, further comprising jam sensing means mounted on said front part of said receipt tray for sensing the document jamming said switchback path.

68. The ADF as claimed in claim 67, further comprising connecting/disconnecting means for selectively connecting or disconnection power supply to said stamping means in interlocked relation to closing or opening, respectively, of said receipt tray.

69. The ADF as claimed in claim 68, further comprising:

a discharge motor for driving a drive roller constituting said second conveying means, said drive roller of said switchback path and said drive roller of said third conveying means; and first drive transmission regulating means for regulating drive transmission from said discharge motor;

wherein when said switchback conveying means switches back the document conveyed from the scanning position and again reverses said document for thereby conveying said document to said receipt tray, said control means switches a direction of rotation of said discharge motor and causes said drive transmission regulation means to switch a direction of rotation of only said drive roller of said switchback conveying means.

70. The ADF as claimed in claim 69, wherein said second conveying means comprises second drive transmission regulating means rotatable at least in a direction in which the document is discharged, said second drive transmission regulating means regulates drive transmission to said drive roller of said second conveying means, and when the document jams said second conveying means, said control means causes said second drive transmission regulating means to interrupt drive transmission to said drive roller of said second conveying means.

* * * * *